United States Patent
Hong et al.

(10) Patent No.: US 7,916,753 B2
(45) Date of Patent: Mar. 29, 2011

(54) METHOD AND APPARATUS FOR REASSEMBLING DOCSIS MAC FRAME IN CABLE MODEM INCLUDING PLURAL RECEIVING CHANNELS

(75) Inventors: Seung Eun Hong, Daejeon (KR); Ho Jin Kwon, Seoul (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 204 days.

(21) Appl. No.: 12/325,487

(22) Filed: Dec. 1, 2008

(65) Prior Publication Data

US 2009/0154498 A1   Jun. 18, 2009

(30) Foreign Application Priority Data

Dec. 18, 2007   (KR) .................. 10-2007-0133500

(51) Int. Cl.
    *H04J 3/24* (2006.01)
(52) U.S. Cl. ..................................... 370/474
(58) Field of Classification Search .......... 370/464–467, 370/474, 498, 503; 709/227, 228, 230–237, 709/246, 249
See application file for complete search history.

(56) References Cited

U.S. PATENT DOCUMENTS

| | | | |
|---|---|---|---|
| 5,933,654 A * | 8/1999 | Galdun et al. .................. | 710/23 |
| 7,526,089 B2 * | 4/2009 | Wada et al. .................... | 380/239 |
| 7,609,727 B2 * | 10/2009 | Choi et al. ..................... | 370/503 |
| 2003/0079230 A1 * | 4/2003 | Woodward et al. ............. | 725/90 |
| 2007/0058680 A1 * | 3/2007 | Choi et al. ..................... | 370/480 |
| 2007/0073935 A1 * | 3/2007 | Kim et al. ........................ | 710/62 |
| 2009/0154498 A1 * | 6/2009 | Hong et al. .................... | 370/474 |

FOREIGN PATENT DOCUMENTS

| | | |
|---|---|---|
| JP | 2005-159433 A | 6/2005 |
| JP | 2007-228497 A | 9/2007 |
| KR | 10-0776978 B1 | 11/2007 |
| KR | 1020070112741 A | 11/2007 |

* cited by examiner

*Primary Examiner* — Dmitry H Levitan
(74) *Attorney, Agent, or Firm* — Ladas & Parry LLP

(57) ABSTRACT

A Data Over Cable Service Interface Specifications (DOCSIS) frame reassembling apparatus and method in a cable modem including a plurality of receiving channels is provided. A method of controlling reassembling of a Media Access Control (MAC) frame, the method including: receiving a signal and outputting a packet signal through demodulation and error correction; receiving the outputted signal and controlling a specific compression format standard header and a point field; receiving packet data and a buffer write enable signal, and writing data in a MAC frame reassembling buffer; storing the data written in the MAC frame reassembling buffer; and reading the stored data from the MAC frame reassembling buffer in response to a received buffer read enable signal, and storing the read data in a MAC frame buffer.

16 Claims, 17 Drawing Sheets

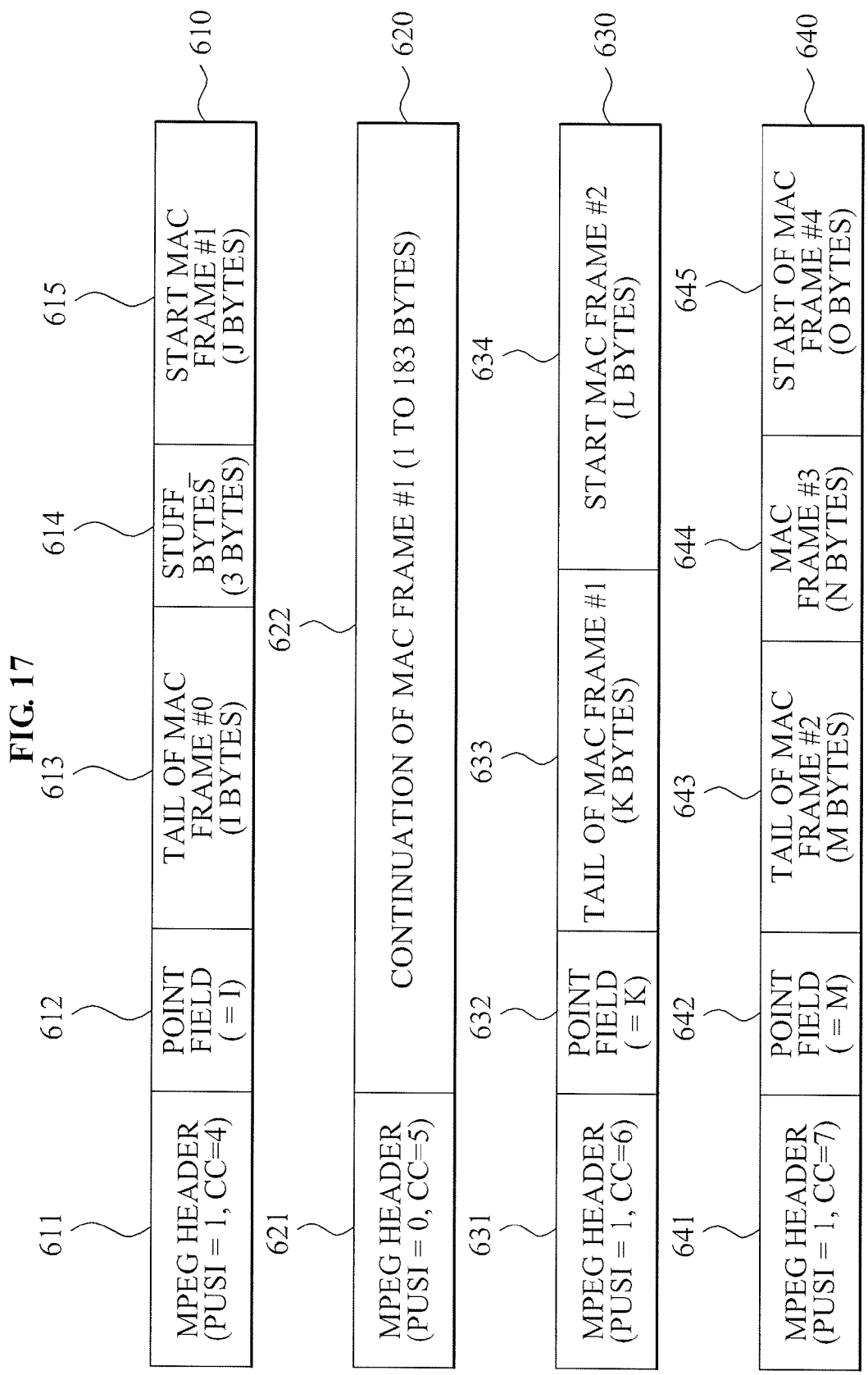

METHOD AND APPARATUS FOR REASSEMBLING DOCSIS MAC FRAME IN CABLE MODEM INCLUDING PLURAL RECEIVING CHANNELS

CROSS-REFERENCE TO RELATED APPLICATION

This application claims priority from Korean Patent Application No. 10-2007-0133500, filed on Dec. 18, 2007, in the Korean Intellectual Property Office, the entire disclosure of which is incorporated herein by reference.

BACKGROUND OF THE INVENTION

1. Field of the Invention

The present invention relates to reassembling technology of a frame, and more particularly, to a Data Over Cable Service Interface Specifications (DOCSIS) frame reassembling apparatus and method in a cable modem including a plurality of receiving channels.

This work was supported by the IT R&D program of MIC/IITA [2006-S-019-02, The Development of Digital Cable Transmission and Receive System for 1 Gbps Downstream].

2. Description of Related Art

A current Data Over Cable Service Interface Specifications (hereinafter, referred to as DOCSIS) cable modem (CM) extracts a DOCSIS Media Access Control (MAC) frame of a variable length from received Motion Picture Experts Group 2-Transport Stream (MPEG2-TS) packets, and processes the DOCSIS MAC frame being loaded in specific compression format standard (for example, MPEG2-TS) packets of a 188-byte fixed length and being transported using a single receiving channel.

A method of loading the DOCSIS MAC frame of the variable length in the MPEG2-TS packets of the fixed length basically includes a 4-byte fixed header an optional 1-byte Point_field, and DOCSIS MAC frame data of a 183-byte or 184-byte length, and the 4-byte MPEG header follows an MPEG standard.

The DOCSIS MAC frame may start in any location of an MPEG2-TS packet payload, and may be included in a single MPEG2-TS packet or may be included over several MPEG2-TS packets based on a DOCSIS MAC frame length.

According to various DOCSIS MAC frame transport methods, the CM needs to extract the DOCSIS MAC frame from the received MPEG2-TS packets. The MPEG2-TS packet may be corrupted by a channel error.

Accordingly, the CM needs to delete the corrupted MPEG2-TS packet when detecting an MPEG2-TS packet error. In this case, loss of the DOCSIS MAC frame based on MPEG2-TS packet deletion needs to be minimized, and new DOCSIS MAC frames need to be extracted from the MPEG2-TS packets received after the MPEG2-TS packet error. In particular, the CM including a plurality of receiving channels needs to extract the DOCSIS frame classified by a channel and use a buffer classified by the channel in order to multiplex the DOCSIS frames among channels. A method of effectively controlling the buffer classified by the channel when the MPEG2-TS packet error occurs is required.

SUMMARY OF THE INVENTION

An aspect of the present invention provides an apparatus and method which can include a Data Over Cable Service Interface Specifications Media Access Control (DOCSIS MAC) frame reassembling buffer classified by a channel, effectively control a MAC frame reassembling buffer when a Motion Picture Experts Group 2-Transport Stream (MPEG2-TS) packet error occurs, minimize DOCSIS MAC frame loss, and extract a new DOCSIS MAC frame from MPEG2-TS packets received after the MPEG2-TS packet error.

According to an aspect of the present invention, there is provided a DOCSIS MAC frame reassembling method in a cable modem including a plurality of receiving channels, the method including: receiving a signal and outputting a packet signal through demodulation and error correction; receiving the outputted signal and controlling a specific compression format standard header and a point field; receiving packet data and a buffer write enable signal, and writing data in a MAC frame reassembling buffer; storing the data written in the MAC frame reassembling buffer; and reading the stored data from the MAC frame reassembling buffer in response to a received buffer read enable signal, and storing the read data in a MAC frame buffer.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 17 is a diagram illustrating a general configuration where DOCSIS MAC frames are transported to specific compression format standard (Motion Picture Experts Group (MPEG)-2) transport streams in a Hybrid Fiber Coax (HFC) network according to an exemplary embodiment of the present invention.

DETAILED DESCRIPTION OF EXEMPLARY EMBODIMENTS

Figure 1:
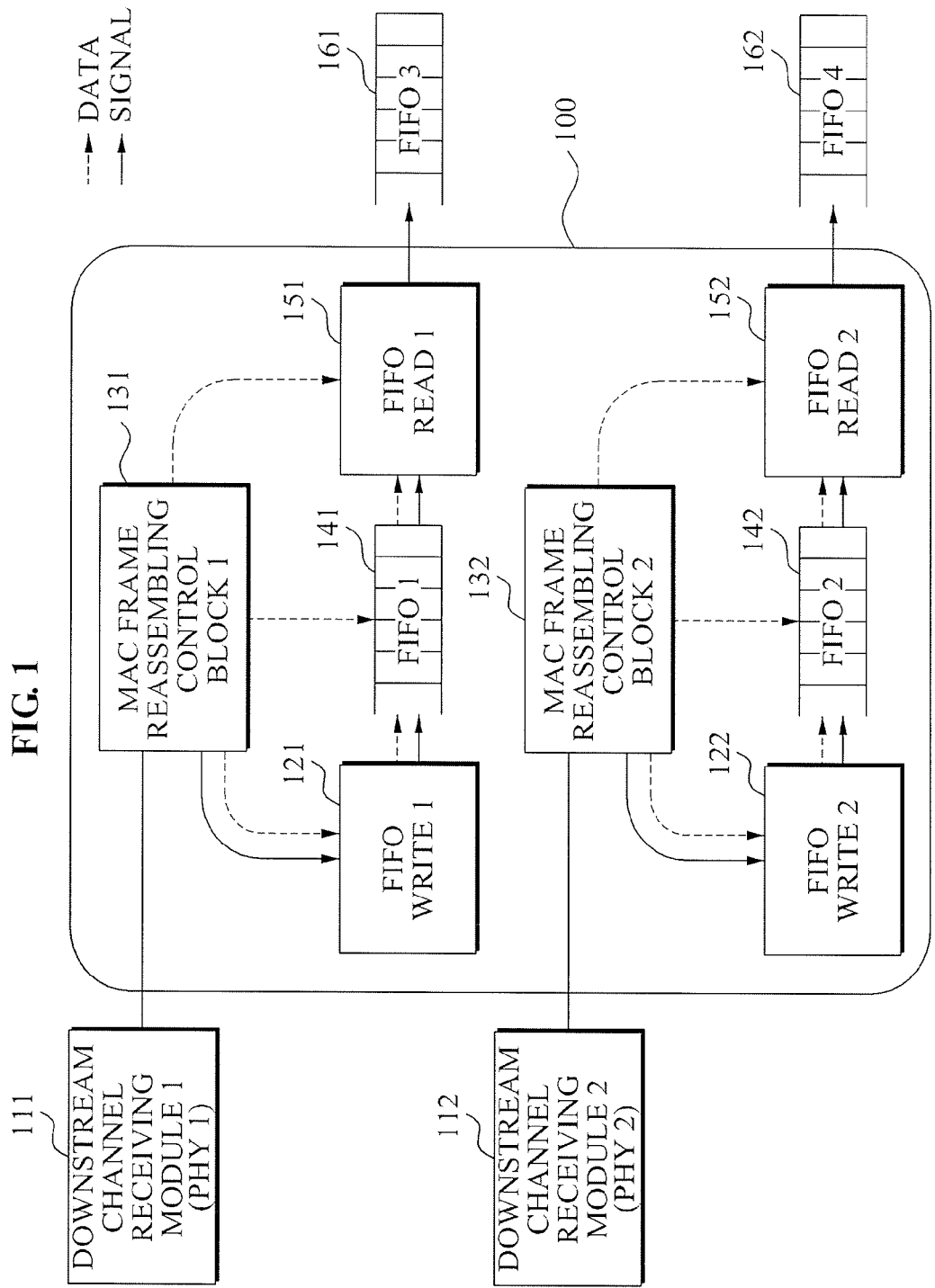
FIG. 1 illustrates a Data Over Cable Service Interface Specifications Media Access Control (DOCSIS MAC) frame reassembling apparatus in a cable modem including two receiving channels according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

A method of loading a Data Over Cable Service Interface Specifications Media Access Control (DOCSIS MAC) frame of a variable length in Motion Picture Experts Group 2-Transport Stream (MPEG2-TS) packets is basically illustrated in Table 1, and specific exemplary embodiments are various.

TABLE 1

| MPEG2-TS packet form including DOCSIS MAC frame | | |
|---|---|---|
| MPEG Header (4 byte) | Point_field (optional, 1 byte) | MPEG Payload (DOCSIS MAC Frame Data with stuff byte, 183 or 184 byte) |

As illustrated in Table 1, the MPEG2-TS packet including the DOCSIS MAC frame includes a 4-byte fixed header, an optional Point_field of 1 byte, and DOCSIS MAC frame data of a 183 or 184 byte length.

The 4-byte MPEG header follows an MPEG standard illustrated in Table 2, and adaptation_field is not used. Point_field exists only when a payload_unit start_indicator (PUSI) bit of the MPEG header is set as 1.

TABLE 2

| MPEG2-TS packet header configuration | | |
|---|---|---|
| Field | Bits | Description |
| sync_byte | 8 | 0x47; MPEG Packet Sync byte |
| transport_error_indicator (TEI) | 1 | Indicates that an error has occurred in the reception of the packet |
| payload_unit_start_indicator (PUSI) | 1 | A value of one indicates the presence of a pointer_field as the first byte of the payload (fifth byte of the packet) |

TABLE 2-continued

| MPEG2-TS packet header configuration | | |
|---|---|---|
| Field | Bits | Description |
| transport_priority | 1 | Reserved; set to zero |
| PID | 13 | DOCSIS Data-Over-Cable well-known PID (0x1FFE) |
| transport_scrambling_control | 2 | Reserved, set to '00' |
| adaptation_field_control | 2 | '01'; use of the adaptation_field is not allowed on the DOCSIS PID |
| continuity_counter (CC) | 4 | cyclic counter within this PID |

The DOCSIS MAC frame may start in any location of an MPEG2-TS packet payload, and may be included in a single MPEG2-TS packet or may be included over several MPEG2-TS packets based on a DOCSIS MAC frame length.

A DOCSIS MAC frame form loaded in the MPEG2-TS packets is described using four exemplary embodiments illustrated in Table 3A to Table 3D.

TABLE 3A

| Case where DOCSIS MAC frame is located right after a Point_field byte | | | |
|---|---|---|---|
| MPEG Header (PUSI = 1) | Point_field (=0) | MAC Frame (Up to 183) | Stuff_bytes (0 or more) |

Table 3A illustrates the MPEG2-TS packet when a start of the DOCSIS MAC frame is located after Point_field. In this case, Point_field corresponds to 0 in order to indicate a start location of the DOCSIS MAC frame, and a valid DOCSIS MAC frame starts from a first byte after Point_field. When the DOCSIS MAC frame is shorter than 183 bytes, Stuff_byte corresponding to a value of FF may exist to an end of the MPEG2-TS packet.

TABLE 3B

| Case where DOCSIS MAC frame is located after Stuff_byte | | | | |
|---|---|---|---|---|
| MPEG Header (PUSI = 1) | Point_field (=M) | Tail of MAC Frame #1 (M byte) | Stuff_bytes (0 or more) | Start of MAC Frame #2 (M byte) |

Table 3B illustrates a general case where the start of the DOCSIS MAC frame in the MPEG2-TS packet is located after a tail portion of DOCSIS MAC frame #1 and a Stuff_byte sequence. In this case, Point_field indicates a first byte location after DOCSIS MAC frame #1.

A byte indicated by Point_field may be Stuff_byte or a start byte of new DOCSIS MAC frame #2.

TABLE 3C

| | | | | | |
|---|---|---|---|---|---|
| | Case where several DOCSIS MAC frames are located in single MPEG2-TS packet |
| MPEG Header (PUSI = 1) | Point_field (=0) | MAC Frame #1 | MAC Frame #2 | Stuff_bytes (0 or more) | MAC Frame #3 |

Table 3C illustrates that a plurality of DOCSIS MAC flames is included in the single MPEG2-TS packet. The plurality of DOCSIS MAC frames may be located immediately after the previous DOCSIS MAC frame and may be located being separated as the Stuff_byte sequence.

TABLE 3D

| | | | | |
|---|---|---|---|---|
| | Case where single DOCSIS MAC frame is located over several MPEG2-TS packets |
| MPEG Header (PUSI = 1) | Point_field (=0) | Stuff_bytes (0 or more) | colspan="2" | Start of MAC Frame #1 (up to 183 byte) |
| MPEG Header (PUSI = 0) | colspan="4" | Continuation of MAC Frame #1 (184 byte) |
| MPEG Header (PUSI = 1) | Point_field (=M) | Tail of MAC Frame #1 (M bytes) | Stuff_bytes (0 or more) | Start of MAC Frame #2 (N bytes) |

Table 3D illustrates that the single DOCSIS MAC frame is transported over three MPEG2-TS packets. Since the second MPEG2-TS packet excludes a start byte of the DOCSIS MAC frame in this case, a PUSI field of the MPEG header corresponds to 0. Accordingly, Point_field does not exist. The third MPEG2-TS packet includes the final portion of DOCSIS MAC frame #1 and new DOCSIS MAC frame #2, and Point_field indicates a byte after a final byte of DOCSIS MAC frame #1.

According to a DOCSIS MAC frame transport method using the MPEG2-TS packet described by the exemplary embodiments of Tables 3A though 3D, a cable modem (CM) needs to extract the DOCSIS MAC frame from the received MPEG2-TS packets. The MPEG2-TS packet may be corrupted by a channel error, and an MPEG2-TS packet error may be detected when a TEI bit of an MPEG2-TS packet header is set as 1 or when a CC value includes a discontinuity value.

The CM needs to delete the corrupted MPEG2-TS packet when detecting the MPEG2-TS packet error, needs to minimize loss of the DOCSIS MAC frame based on MPEG2-TS packet deletion, and needs to extract the new DOCSIS MAC frames from the MPEG2-TS packets received after the MPEG2-TS packet error. In particular, the CM including a plurality of receiving channels needs to extract the DOCSIS MAC frame classified by a channel, needs to use a buffer classified by the channel in order to multiplex the DOCSIS MAC frames among channels, and needs to effectively control the buffer classified by the channel when the MPEG2-TS packet error occurs.

FIG. 1 illustrates a DOCSIS MAC frame reassembling apparatus 100 in a CM including two receiving channels according to an exemplary embodiment of the present invention.

Hereinafter, referring to FIG. 1, a configuration and a function of the DOCSIS MAC frame reassembling apparatus 100 in the CM including the two receiving channels according to an exemplary embodiment of the present invention are described.

The DOCSIS MAC frame reassembling apparatus 100 according to an exemplary embodiment of the present invention includes downstream channel receiving modules 111 and 112 (PHY 1 and PHY 2), MAC frame reassembling buffer write modules 121 and 122 (First In First Out (FIFO) Write 1 and FIFO Write 2), MAC frame reassembling control modules 131 and 132 (MAC frame reassembling control block 1 and MAC frame reassembling control block 2), MAC frame reassembling buffer modules 141 and 142 (FIFO 1 and FIFO 2), MAC frame reassembling buffer read modules 151 and 152 (FIFO Read 1 and FIFO Read 2), and MAC frame buffer modules 161 and 162 (FIFO 3 and FIFO 4), and the like, and the exemplary embodiment of the present invention is described below.

The downstream channel receiving modules 111 and 112 receive a Radio Frequency (RF) signal from a Hybrid Fiber Coax (HFC) network, and output an MPEG2-TS packet signal through demodulation and Forward Error Correction (FEC) of the RF signal.

The MAC frame reassembling buffer write modules 121 and 122 receive MPEG2-TS packet data and a write enable signal and store data in the MAC frame reassembling buffer modules 141 and 142.

The MAC frame reassembling control modules 131 and 132 control an MPEG header and Point_field. In particular, while processing the MPEG header, the MAC frame reassembling control modules 131 and 132 inspect a TEI error and a CC field error and process the MPEG header, recognize a start location of a new DOCSIS MAC frame using a PUSI and a Point_field value, and process the MPEG header.

The MAC frame reassembling buffer modules 141 and 142 are storage buffers (FIFO) for reassembling of the DOCSIS MAC frame.

The MAC frame reassembling buffer read modules 151 and 152 receive the data from a read enable signal from the MAC frame reassembling buffer modules 141 and 142, compare a length field value in a DOCSIS MAC header and a length of the MAC frame reassembling buffer, read a single complete DOCSIS MAC frame from the MAC frame reassembling buffer, and store the read DOCSIS MAC frame in a MAC frame buffer.

The MAC frame buffer modules 161 and 162 are buffers for storing the single complete DOCSIS MAC frame, store the single complete DOCSIS MAC frame for each channel, and are composed to subsequently and selectively process a single MAC frame processing module from among a plurality of buffers.

Figure 2:
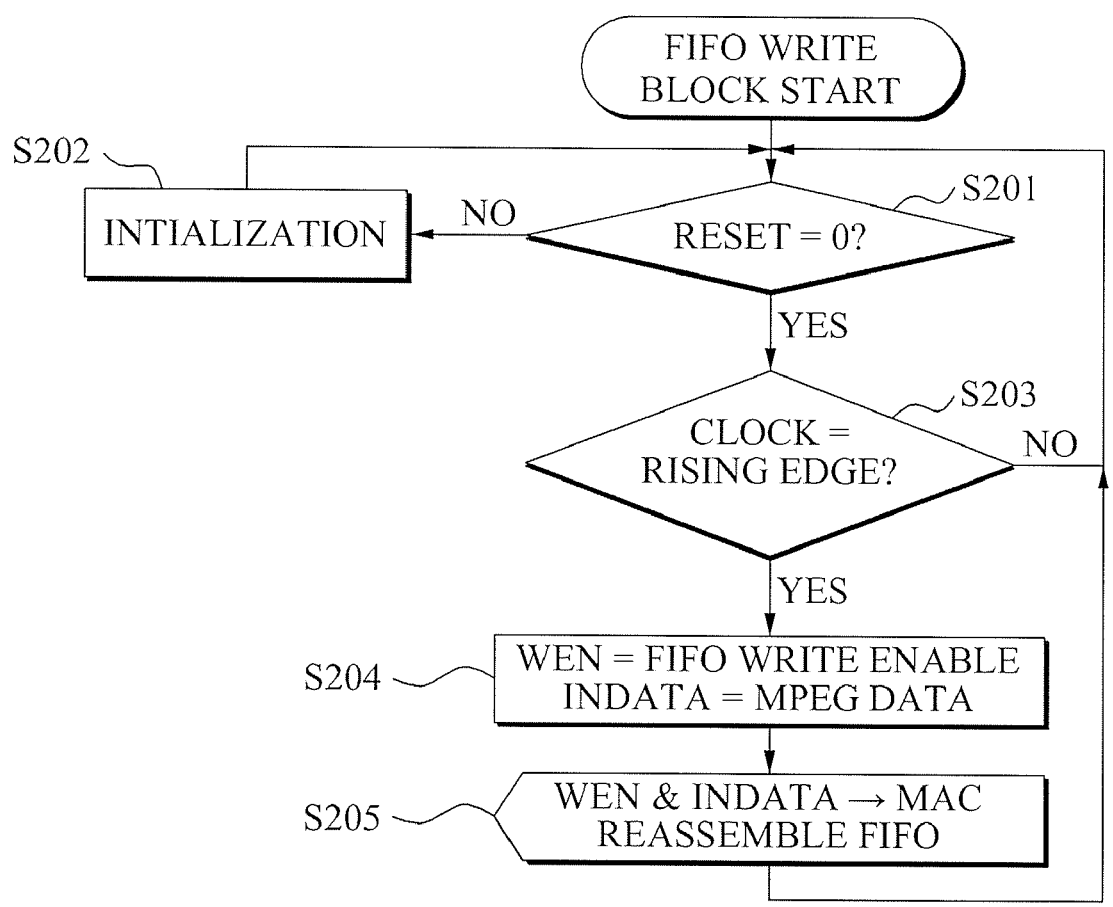
FIG. 2 is a flowchart illustrating MAC frame reassembling buffer write operations according to an exemplary embodiment of the present invention.

FIG. 2 is a flowchart illustrating MAC frame reassembling buffer write operations according to an exemplary embodiment of the present invention.

As illustrated in FIG. 2, the MAC frame reassembling buffer write modules 121 and 122 first inspect a reset signal in operation S201 initialize all used values when the reset signal is verified as being on, in operation S202, and verify that a used clock rises from 0 to 1 when the reset signal is verified as being off, in operation S203. When the clock is verified as rising to 1, the MAC frame reassembling buffer write modules 121 and 122 output a buffer (FIFO) write enable signal and buffer write data to a MAC frame reassembling buffer in operations S204 and S205.

Figure 3:
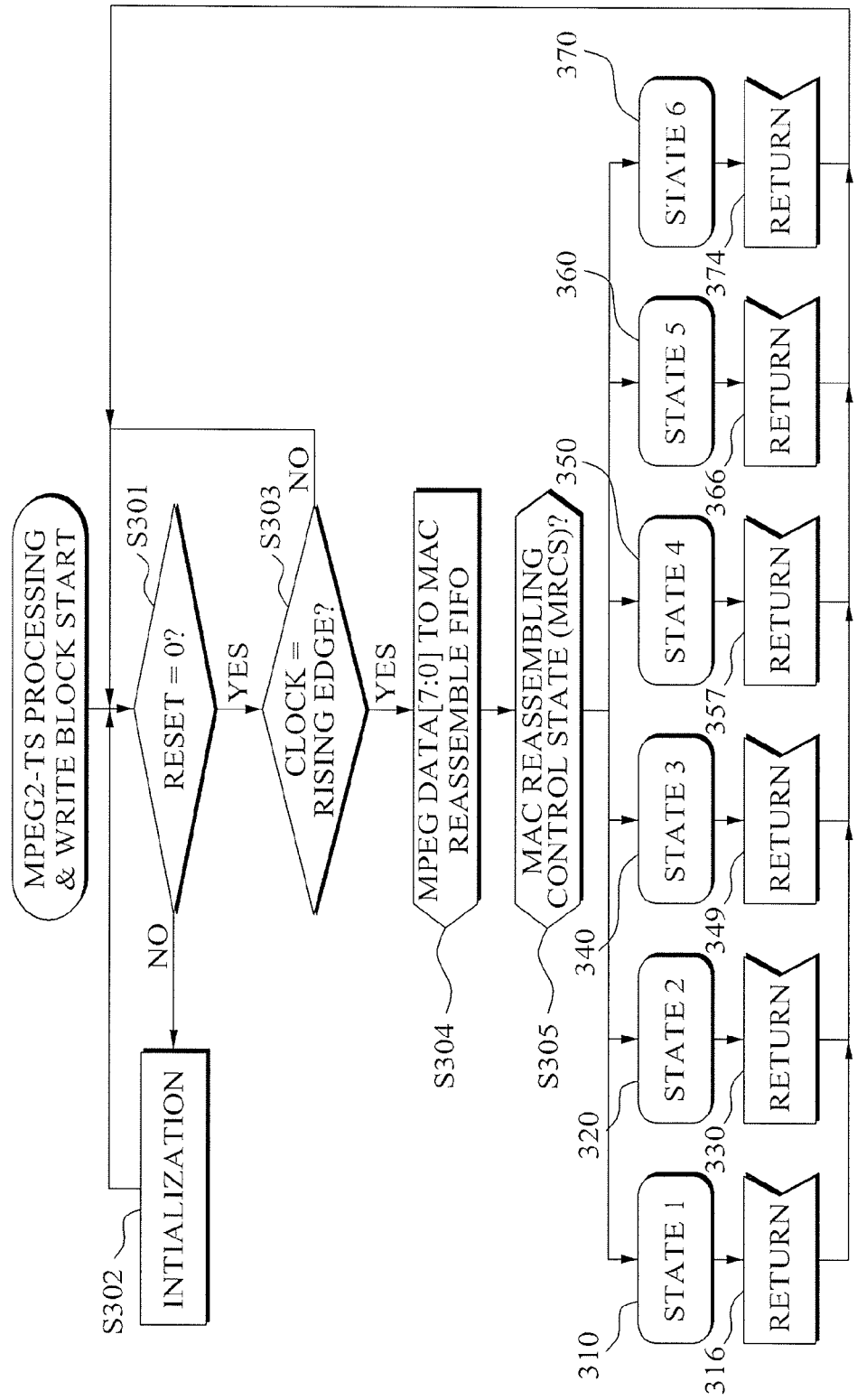
FIG. 3 is a flowchart illustrating operations of a MAC frame reassembling control module according to an exemplary embodiment of the present invention.

FIG. 3 is a flowchart illustrating operations of the MAC frame reassembling control modules 131 and 132 according to an exemplary embodiment of the present invention.

The MAC frame reassembling control modules 131 and 132 inspect a reset signal in operation S301, initialize all used values when the reset signal is on, in operation S302, and verify that a used clock rises from a low state to a high state when the reset signal is off, in operation S303.

The MAC frame reassembling control modules 131 and 132 output MPEG data of an 8-bit length to the MAC frame reassembling buffer write modules 121 and 122 each time the clock is verified as rising to the high state, in operation S304, inspect a MAC Reassembling Control State (MRCS) in operation S305, transition between states based on the control state in operations S310 through S370, and subsequently wait to return in operations S315 through S374.

Figure 4:
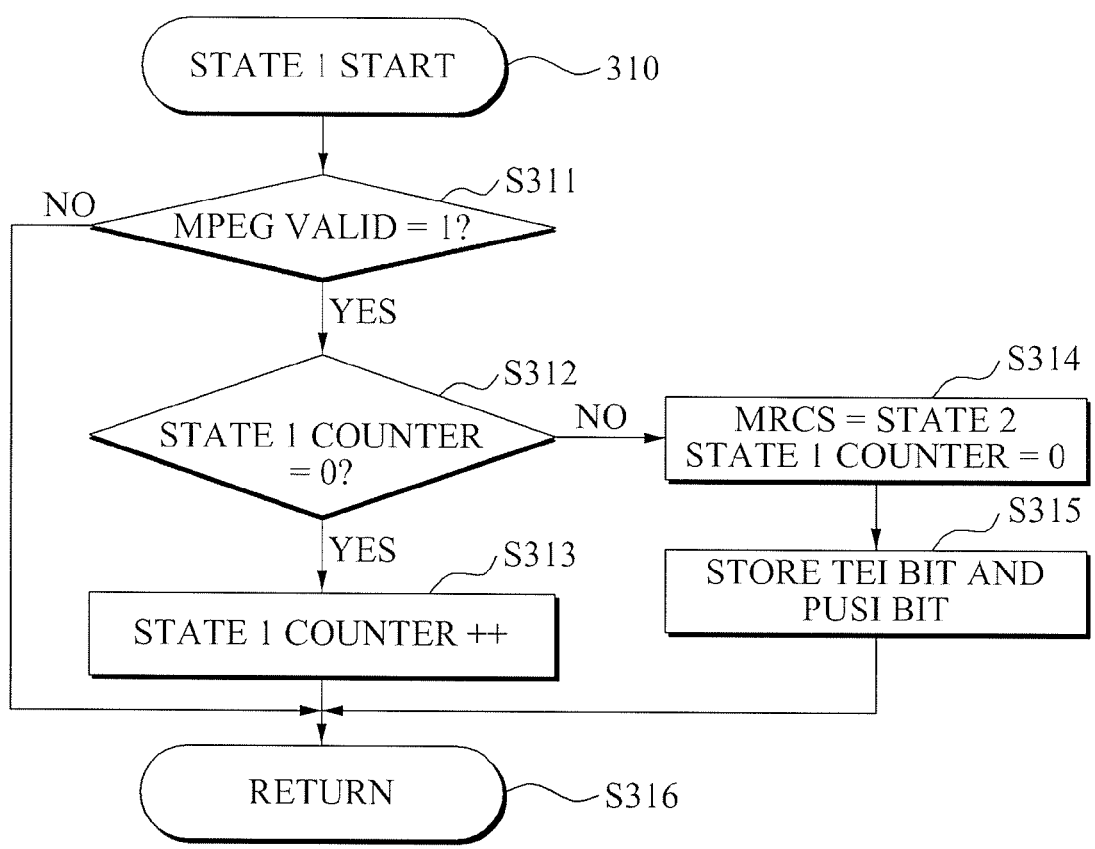
FIG. 4 is a flowchart illustrating operations when a MAC Reassembling Control State (MRCS) of FIG. 3 corresponds to [state 1]

FIG. 4 is a flowchart illustrating operations when the MRCS of FIG. 3 corresponds to [state 1] 310.

[State 1] 310 is an operation of consecutively receiving 8-bit data composing an MPEG2-TS packet when an MPEG validity signal (this signal indicating a valid MPEG2-TS packet byte input) is received, eliminating a synchronization byte being a first byte, and checking a TEI bit and a PUSI bit in a second byte.

For this, the DOCSIS MAC frame reassembling apparatus 100 first inspects the MPEG valid signal in operation S311, inspects a state 1 counter value when the MPEG valid signal corresponds to 1, in operation S312, and increases the state 1 counter value by one when the value is verified as 0, in operation S313.

However, when the value is verified as 1, the DOCSIS MAC frame reassembling apparatus 100 transitions the MRCS to [state 2] and initializes the state 1 counter value in operation S314, stores the TEI bit and the PUSI bit from the received MPEG data and returns in operations S315 and S316.

Figure 5:
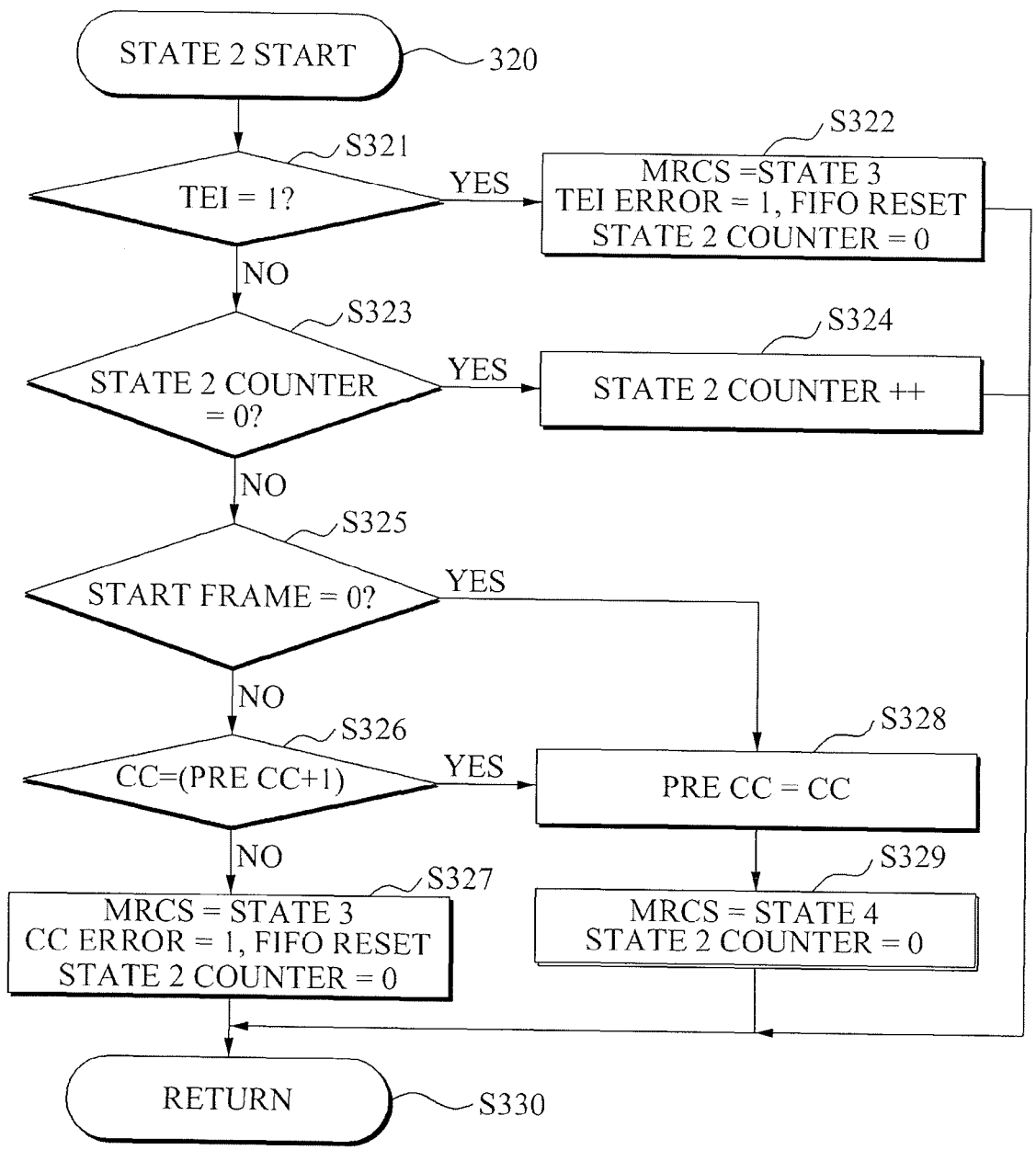
FIG. 5 is a flowchart illustrating operations when the MRCS of FIG. 3 corresponds to [state 2]

FIG. 5 is a flowchart illustrating operations when the MRCS of FIG. 3 corresponds to [state 2] 320.

[State 2] 320 is an operation of inspecting a TEI field and a CC field error of a received MPEG2-TS packet, initializing a MAC frame reassembling buffer and simultaneously transitioning to [state 3] when the error occurs, and updating a CC value and transitioning to [state 4] when the error does not occur.

For this, the DOCSIS MAC frame reassembling apparatus 100 first inspects a TEI field bit in operation S321. When the TEI bit corresponds to 1 and the error is verified as occurring, the DOCSIS MAC frame reassembling apparatus 100 transitions the MRCS to [state 3], sets and outputs a signal of the TEI field as on, and initializes a state 2 counter value and a MAC reassembling buffer module in operation S322.

When the TEJ bit corresponds to 0 and the error is verified as not occurring, the DOCSIS MAC frame reassembling apparatus 100 inspects the state 2 counter value in operation S323, and increases the state 2 counter by one when the value corresponds to 0, in operation S324, and inspects a start frame signal when the value is different from 0.

When a start frame signal value corresponds to 1, the DOCSIS MAC frame reassembling apparatus 100 compares a CC value acquired from an MPEG frame and a previous CC value in operation S326, changes the previous CC value into a current CC value when the start frame value is 0 or when the CC values are same, in operation S328, and transitions the MRCS to [state 4] and sets the state 2 counter value as 0 in operation S329. However, when the CC values are different from each other, the DOCSIS MAC frame reassembling apparatus 100 transitions the MRCS to [state 3], sets and outputs a CC error signal as 1, and initializes the state 2 counter value and the MAC reassembling buffer module in operation S322.

When operation S327 is completed, the DOCSIS MAC frame reassembling apparatus 100 returns to an initialization mode in operation S330.

Figure 6:
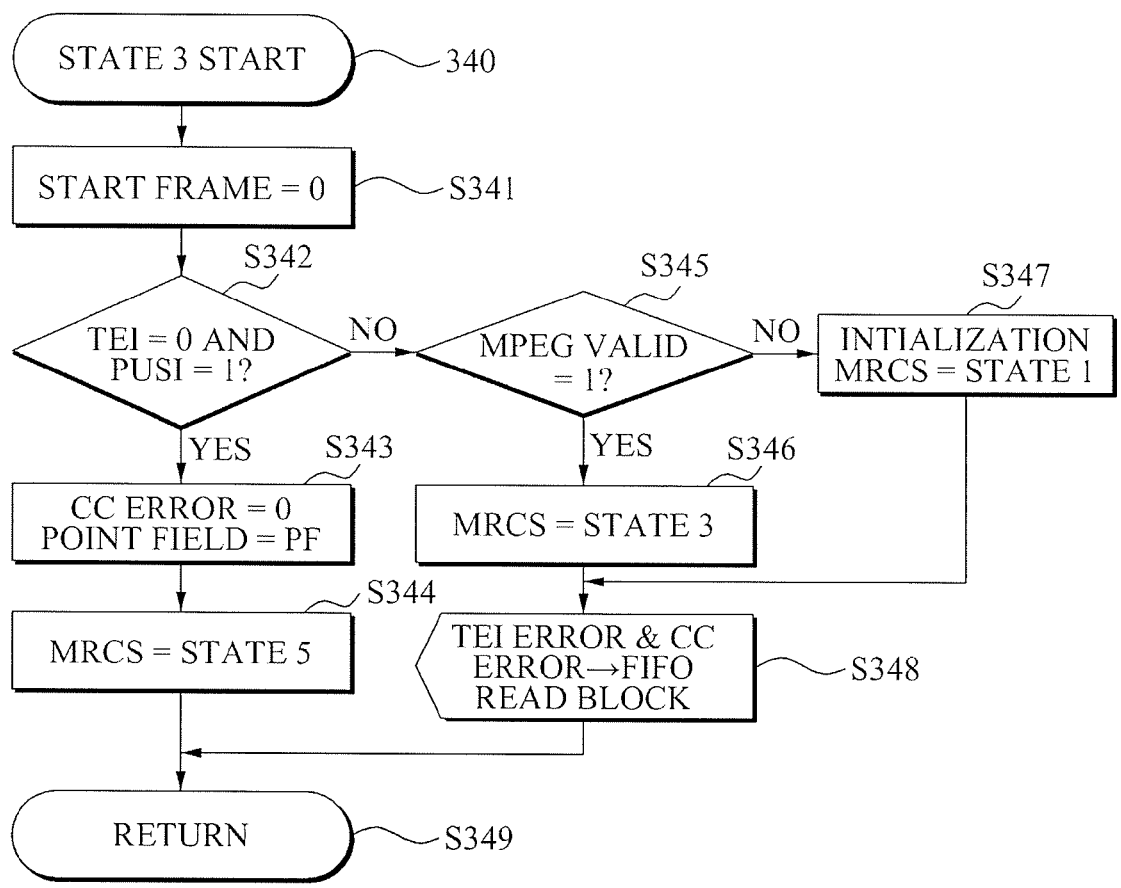
FIG. 6 is a flowchart illustrating operations when the MRCS of FIG. 3 corresponds to [state 3]

FIG. 6 is a flowchart illustrating operations when the MRCS of FIG. 3 corresponds to [state 3] 340.

[State 3] 340 is an operation of transitioning to [state 5] after storing Point_field value for recognizing a start of a new MAC frame when a transport error occurs in an MPEG packet or when a CC error occurs, that is, when a single MAC frame exists.

When a TEI field is set in an MPEG2-TS packet or when a PUSI bit corresponds to 0 and a CC error occurs, the DOCSIS MAC frame reassembling apparatus 100 returns to [state 1] after initializing a MAC frame reassembling buffer read block and deleting the received single MPEG2-TS packet. When the CC error occurs in the MPEG2-TS packet in which the PUSI bit corresponds to 1, the DOCSIS MAC frame reassembling apparatus 100 may recognize a start of a new DOCSIS MAC frame. Accordingly, [state 3] 340 is composed to transition to [state 5] after storing the Point_field value.

For this, [state 3] 340 sets a start frame signal as 0 in operation S341, inspects a TEI field bit and a PUSI bit in operation S342, sets the CC error as 0 when the TEI bit corresponds to 0 and the PUSI bit corresponds to 1 and sets the Point_field value of MPEG data as PF in operation S343, and sets the MRCS as [state 5] in operation S344.

When the TEI bit corresponds to 1 or the PUSI bit corresponds to 0, the DOCSIS MAC frame reassembling apparatus 100 inspects an MPEG valid signal in operation S345, initializes the values when the MPEG valid signal is verified as 0, and sets the MRCS as [state 1].

When the MPEG valid signal is verified as 1, the DOCSIS MAC frame reassembling apparatus 100 maintains the MRCS as [state 3] in operation S346, outputs an error signal of a TEI and a CC to a MAC reassembling buffer read module and returns in operation S348.

When operation S344 is completed, the DOCSIS MAC frame reassembling apparatus 100 returns to an initialization mode in operation S349.

Figure 7:
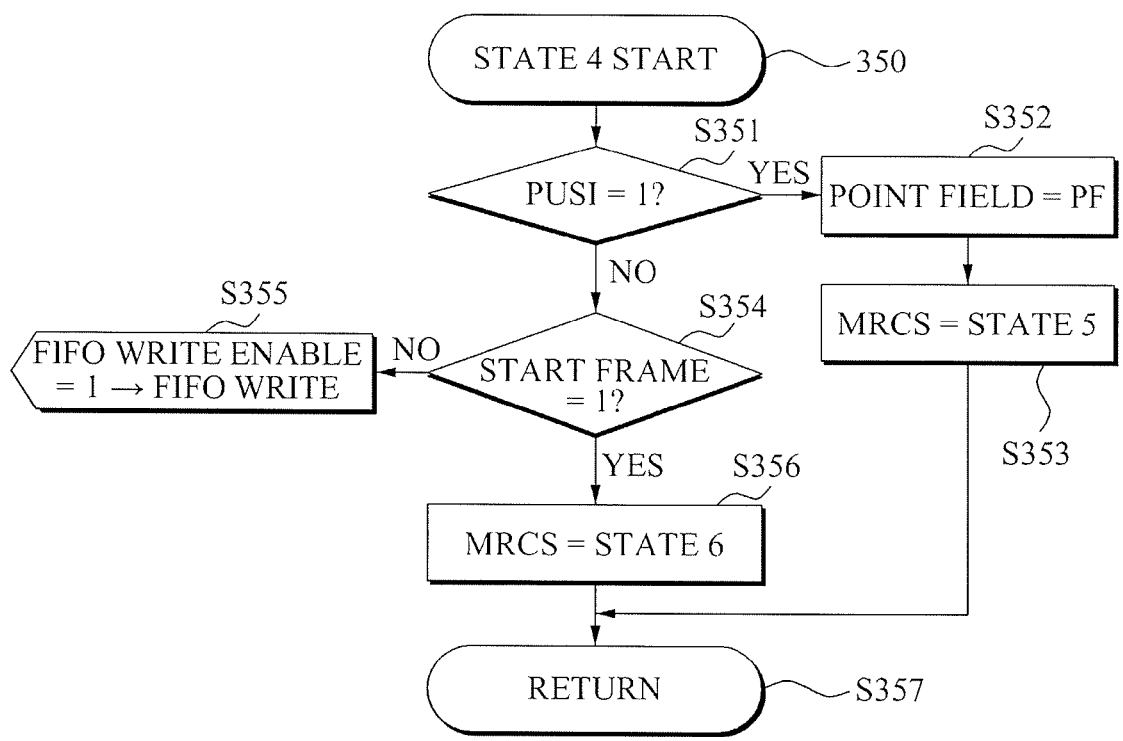
FIG. 7 is a flowchart illustrating operations when the MRCS of FIG. 3 corresponds to [state 4]

FIG. 7 is a flowchart illustrating operations when the MRCS of FIG. 3 corresponds to [state 4].

As illustrated in FIG. 7, [state 4] 350 is an operation of verifying whether a PUSI bit corresponds to 1, transitioning to [state 5] after storing a Point_field when the PUSI bit corresponds to 1, inspecting a start frame signal when the PUSI bit corresponds to 0, and verifying whether data is stored in a MAC frame reassembling buffer.

When the data is stored in the MAC frame reassembling buffer, the start frame signal corresponds to 1, and this denotes that the data in a currently-received MPEG2-TS packet is valid. Conversely, when the data is not stored in the MAC frame reassembling buffer, the start frame signal corresponds to 0, and this denotes that the data in the currently-received MPEG2-TS packet is invalid. Since the corresponding data needs to be stored in the MAC frame reassembling buffer in the case of the valid data, the DOCSIS MAC frame reassembling apparatus 100 transitions to [state 6] by setting a storage signal as 1 in the MAC frame reassembling buffer. Since the corresponding data needs to be deleted in the case of the invalid data, the DOCSIS MAC frame reassembling apparatus 100 transitions to [state 6] by setting the storage signal as 0 in the MAC frame reassembling buffer.

For this, the DOCSIS MAC frame reassembling apparatus 100 first inspects a PUSI bit in operation S351, sets and stores a Point_field value of MPEG data as PF when the PUSI bit is on, in operation S352, transitions the MRCS to [state 5] in operation S353, inspects the start frame signal when the PUSI bit is off, and verifies whether the data is stored in the MAC frame reassembling buffer in operation S354.

When the data is verified as being stored in the MAC frame reassembling buffer, the DOCSIS MAC frame reassembling apparatus 100 stores the corresponding data in the MAC frame reassembling buffer by setting the storage signal as being on in the MAC frame reassembling buffer, and transitions to [state 6] in operation S356. Conversely, when the data is verified as not being stored in the MAC frame reassembling buffer, the DOCSIS MAC frame reassembling apparatus 100 deletes the corresponding data by setting the storage signal as being off in the MAC frame reassembling buffer in operation S355, and directly transitions to [state 6].

When operation S356 is completed, the DOCSIS MAC frame reassembling apparatus 100 returns to an initialization mode in operation S357.

Figure 8:
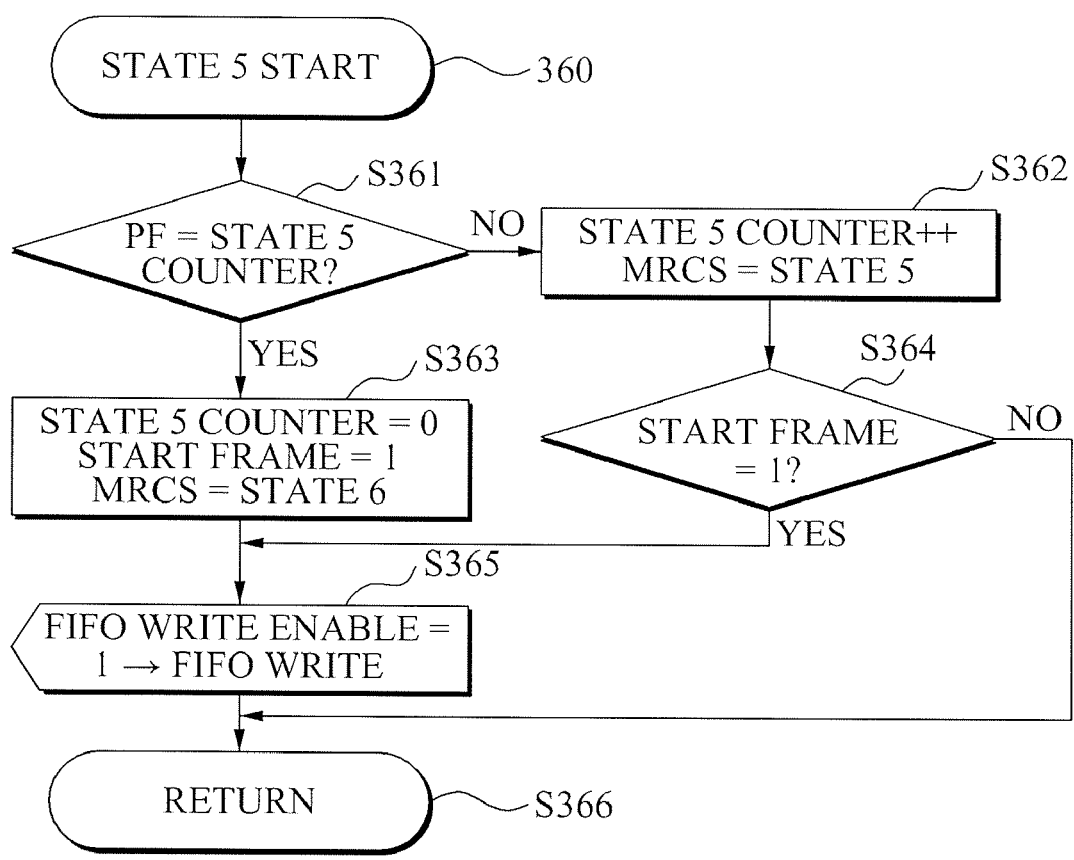
FIG. 8 is a flowchart illustrating operations when the MRCS of FIG. 3 corresponds to [state 5]

FIG. 8 is a flowchart illustrating operations when the MRCS of FIG. 3 corresponds to [state 5].

As illustrated in FIG. 8, since [state 5] 360 needs to recognize a start of a DOCSIS MAC frame using a stored Point_field value, [state 5] 360 operates a packet receiving counter and compares a packet receiving counter value and the Point_field value. The DOCSIS MAC frame reassembling apparatus 100 compares the Point_field (PF) value and a state 5 counter value (the packet receiving counter) in operation S361.

When the packet receiving counter value are different from the Point_field (PF) value, the DOCSIS MAC frame reassembling apparatus 100 increases the state 5 counter value by one, and maintains the MRCS as [state 5] in operation S362, inspects a start frame signal in operation S364, and verifies whether data corresponds to valid data necessary for reassembling of a previous DOCSIS MAC frame, or corresponds to invalid data.

Similar to [state 4], validity of the data is determined by a start frame signal value, and the data corresponds to the valid data in the case of 1 and corresponds to the invalid data in the case of 0. The valid data is stored in the MAC frame reassembling buffer by setting an FIFO valid signal as 1 in a MAC reassembling buffer write module in operation S365, and the invalid data operates to be directly completed and to be deleted.

Since a fact that the packet receiving counter value is same as the Point_field (PF) value denotes starting to receive data of a new DOCSIS MAC frame, the DOCSIS MAC frame reassembling apparatus 100 initializes the state 5 counter value, updates the start frame signal to be on, and transitions the MRCS to [state 6] in operation S363, and sets and outputs a buffer write enable signal as being on to a MAC reassembling buffer write module, and returns in operations S365 and S366.

Figure 9:
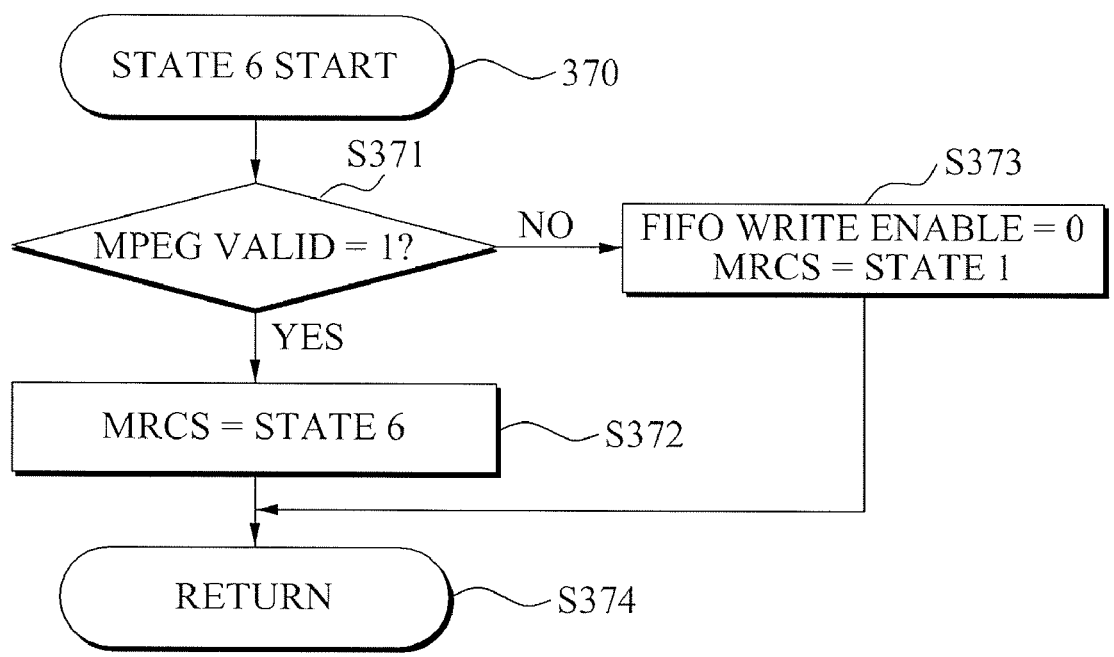
FIG. 9 is a flowchart illustrating operations when the MRCS of FIG. 3 corresponds to [state 6]

FIG. 9 is a flowchart illustrating operations when the MRCS of FIG. 3 corresponds to [state 6].

As illustrated in FIG. 9, [state 6] 370 verifies whether receiving of a single MPEG2-TS packet is completed, using an MPEG valid signal in operation S371. When the receiving is verified as not being completed (=1), the DOCSIS MAC frame reassembling apparatus 100 maintains the MRCS as [state 6] in operation S372, and when the receiving is verified as being completed (=0), the DOCSIS MAC frame reassembling apparatus 100 returns to an initialization state.

This is possible by setting and outputting an FIFO valid signal as 0 to a MAC reassembling buffer write module, transitioning the MRCS to [state 1] in operation S373, and returning in operation S374.

Figure 10:
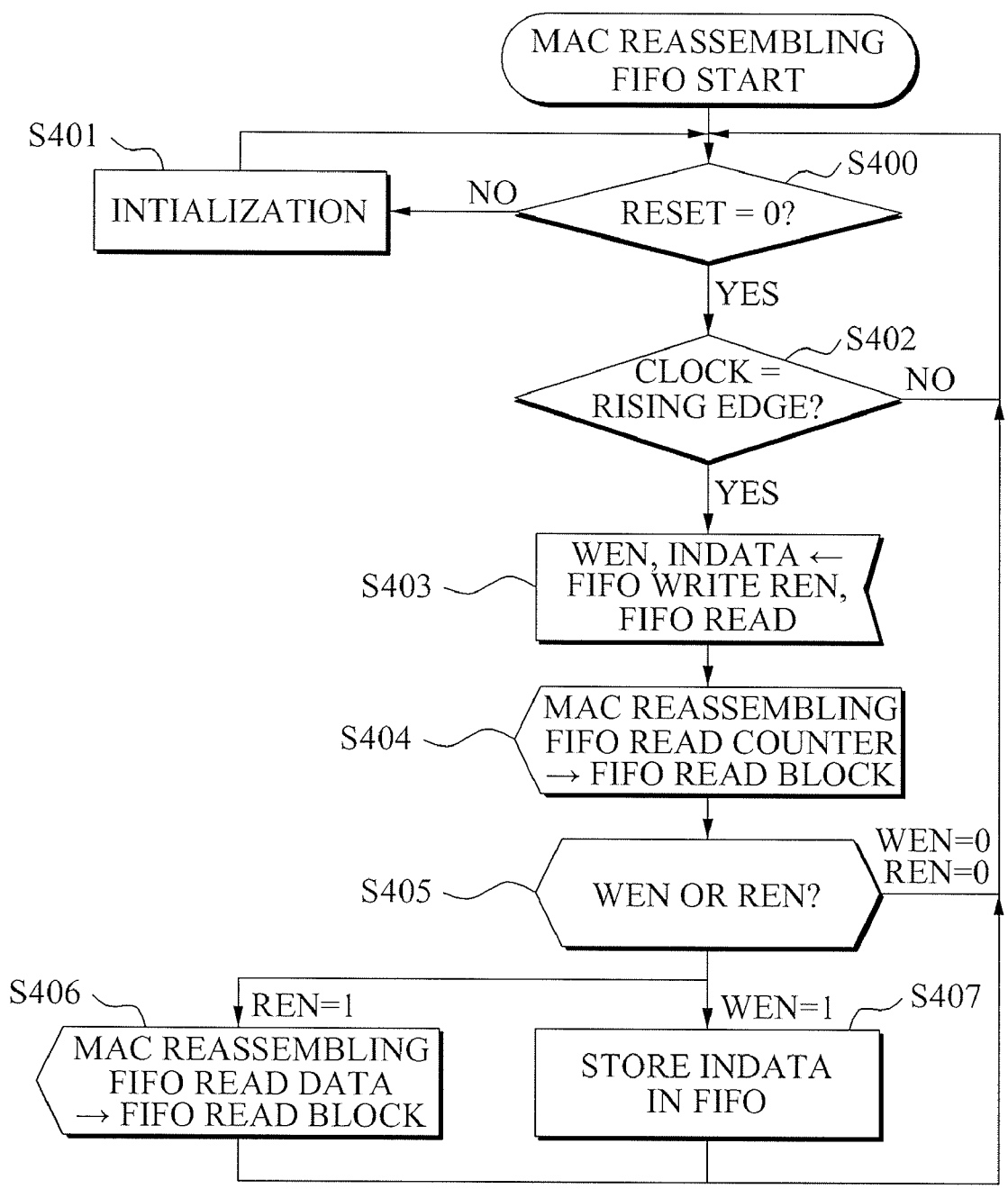
FIG. 10 is a flowchart illustrating operations of a MAC frame reassembling buffer module according to an exemplary embodiment of the present invention.

FIG. 10 is a flowchart illustrating operations of the MAC frame reassembling buffer modules 141 and 142.

The MAC frame reassembling buffer modules 141 and 142 inspect a reset signal in operation S400, and initialize all used values when the reset signal is on, in operation S401. However, when the reset signal is off, the MAC frame reassembling buffer modules 141 and 142 verify that a used clock rises from a low state to a high state in operation S402 receive a write enable signal and data from a MAC reassembling buffer write module each time the clock rises from the low state to the high state and receive a read enable signal from a MAC reassembling buffer read module in operation S403.

The MAC frame reassembling buffer modules 141 and 142 output a read counter value to the MAC reassembling buffer read module in operation S404, inspect the write enable signal (wen) and the read enable signal (ren) in operation S405, output the data to the MAC reassembling buffer read module when the read enable signal corresponds to 1, in operation S406, and write the received data in the MAC frame reassembling buffer (FIFO) when the write enable signal corresponds to 1, in operation S407.

Figure 11:
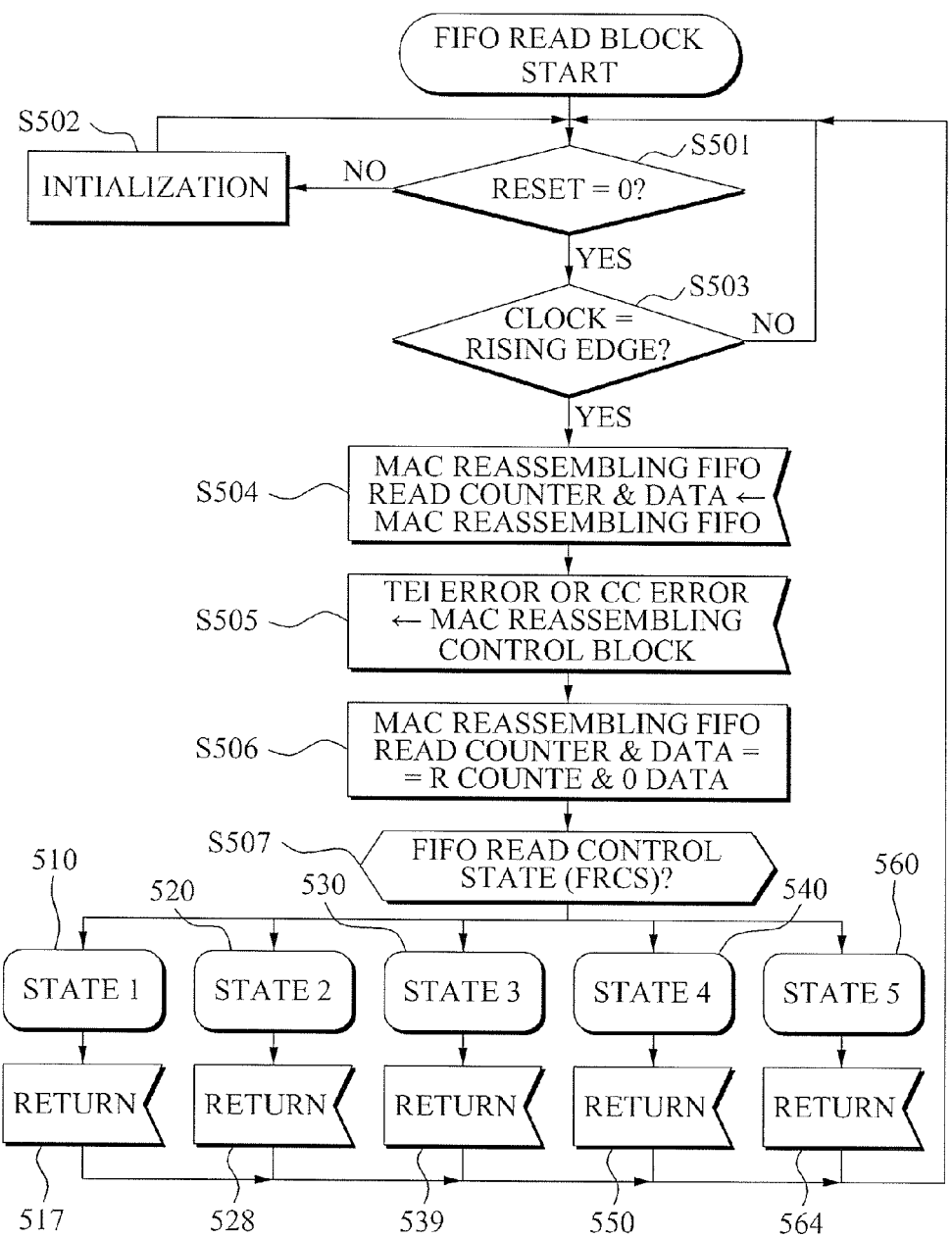
FIG. 11 is a flowchart illustrating operations of a MAC frame reassembling buffer read module according to an exemplary embodiment of the present invention.

FIG. 11 is a flowchart illustrating operations of the MAC frame reassembling buffer read modules 151 and 152.

As illustrated in FIG. 11, the MAC frame reassembling buffer read modules 151 and 152 first inspect a reset signal in operation S501, initialize all used values when the reset signal is on, in operation S502, and verify that a used clock rises from a low state to a high state when the reset signal is off, in operation S503.

Each time the clock is verified as rising to the high state, the MAC frame reassembling buffer read modules 151 and 152 receive a read counter value and data from a MAC reassembling buffer module in operation S504, and receive an error signal of a TEI field and a CC field from a MAC reassembling control module in operation S505. The MAC frame reassembling buffer read modules 151 and 152 set an R counter and an R data signal value as the received counter value and a data value in operation S506, inspect a buffer read control state in operation S507, transition between states based on the control state in operations 510 through 560, wait for transitioning between states and returning in operations 517 through 564.

Figure 12:
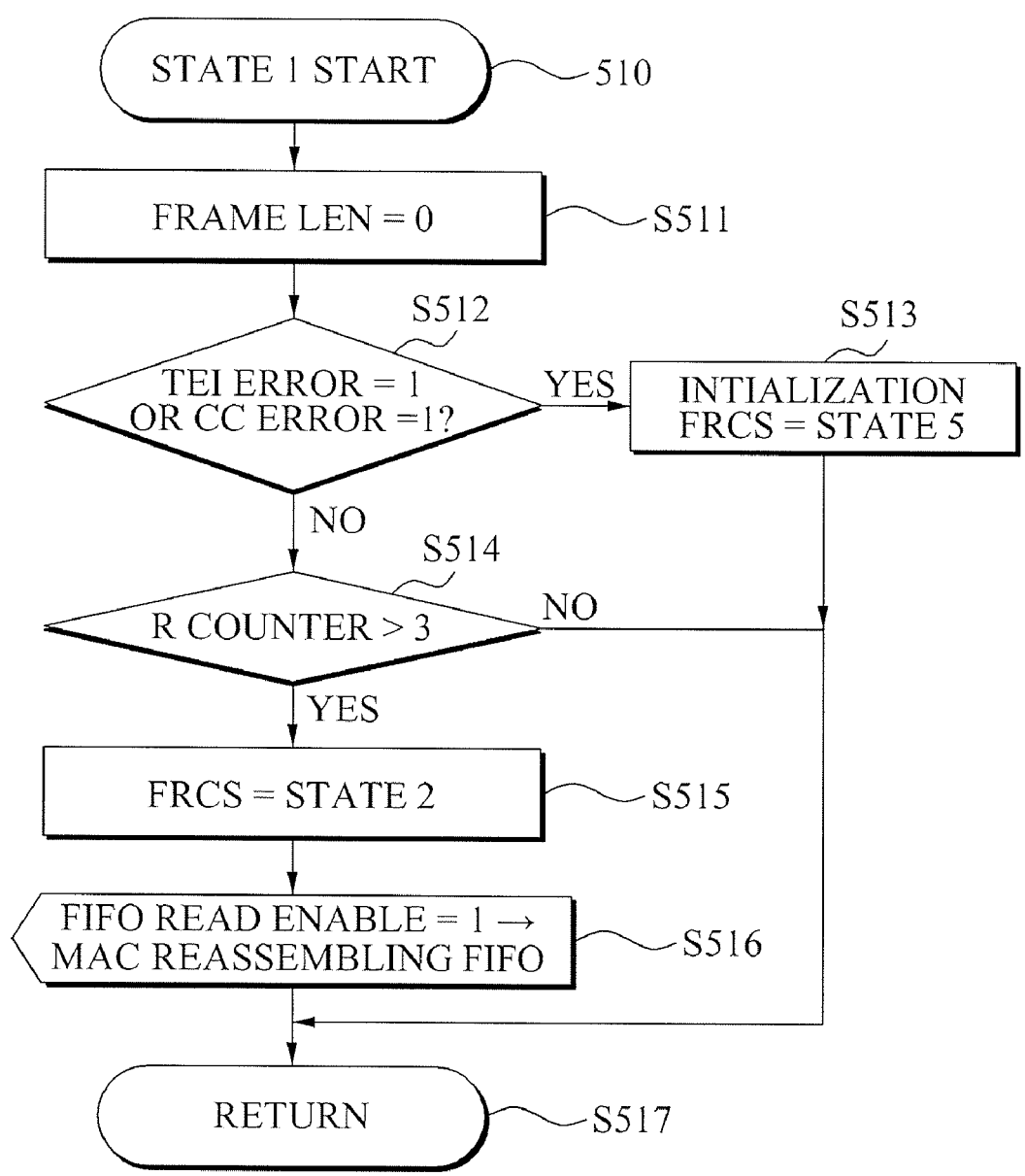
FIG. 12 is a flowchart illustrating operations when a buffer read control state of FIG. 11 corresponds to [state 1]

FIG. 12 is a flowchart illustrating operations when the buffer read control state of FIG. 11 corresponds to [state 1].

As illustrated in FIG. 12, [state 1] 510 waits for data being greater than or equal to 4 bytes to be stored in a MAC frame reassembling buffer. This denotes a general case where a LEN field indicating a length of a DOCSIS MAC frame is stored in the MAC frame reassembling buffer. When the data being greater than or equal to 4 bytes is stored, the DOCSIS MAC frame reassembling apparatus 100 sets a MAC frame reassembling buffer read signal as 1, and transitions to [state 2]. For this, the DOCSIS MAC frame reassembling apparatus 100 first initializes a frame length (LEN) signal in operation S511, and inspects an error signal of a TEI field and a CC field in operation S512.

When the error signal of the TEI field is verified as being on or when the error signal of the CC field is verified as being on, the DOCSIS MAC frame reassembling apparatus 100 initializes all signals when the MAC frame reassembling control module reports that the error occurs, and transitions the buffer read control state to [state 5] in operation S513.

However, when a transport error or a CC error is verified as not existing, the DOCSIS MAC frame reassembling apparatus 100 inspects an R counter value in operation S514, transitions the buffer read control state to [state 2] when the value is greater than 3, in operation S515, and outputs a MAC reassembling buffer read on signal to the MAC reassembling buffer module in operation S516.

When operation S516 is completed, the DOCSIS MAC frame reassembling apparatus 100 returns to an initialization mode in operation S517.

Figure 13:
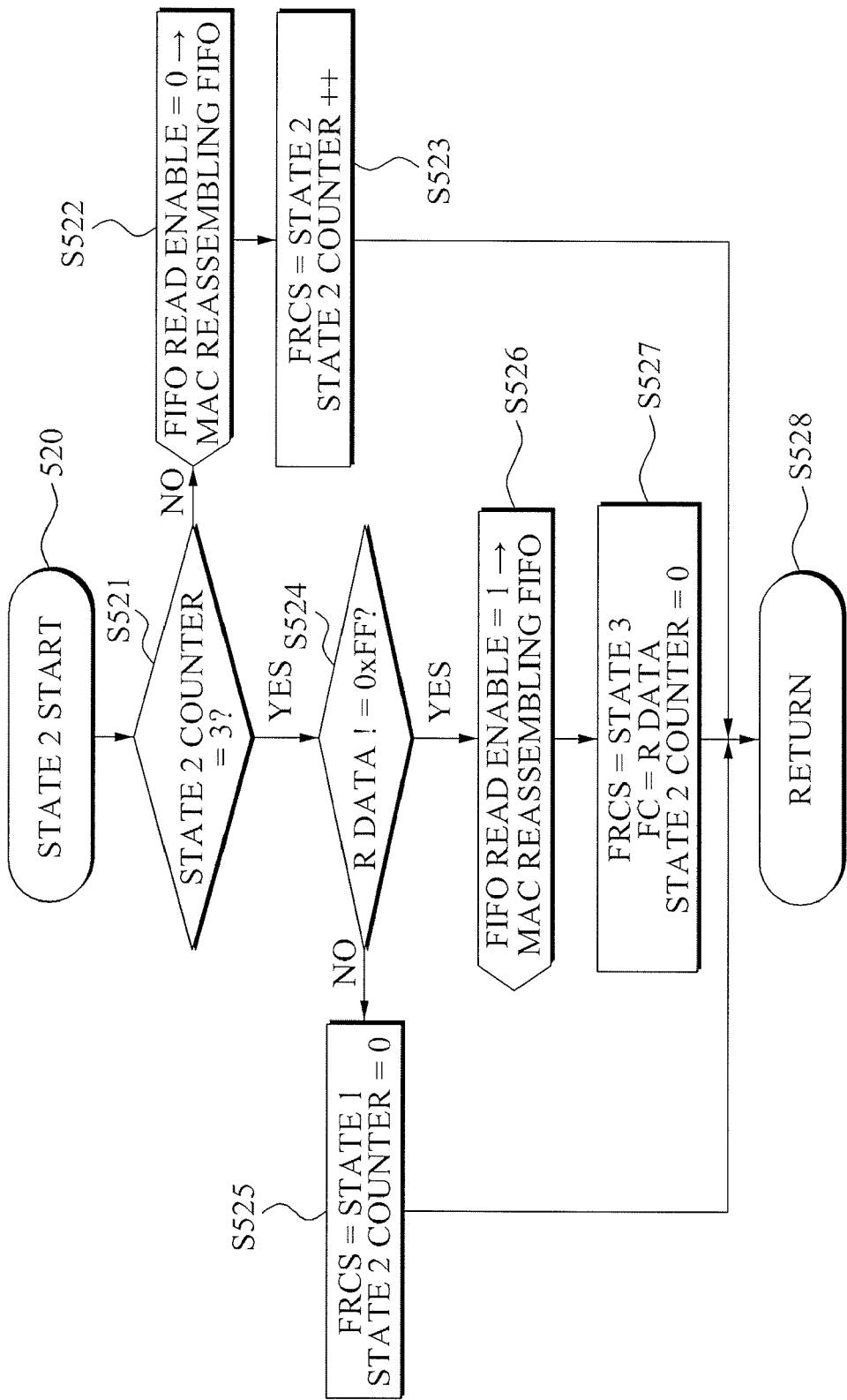
FIG. 13 is a flowchart illustrating operations when the buffer read control state of FIG. 11 corresponds to [state 2]

FIG. 13 is a flowchart illustrating operations when the buffer read control state of FIG. 1 corresponds to [state 2] according to an exemplary embodiment of the present invention.

As illustrated in FIG. 13, [state 2] 520 reads only 1 byte from a MAC frame reassembling buffer, deletes the read data in the case of the 0xFF data, and returns to an initial state. However, when the read data is different from 0xFF, the DOCSIS MAC frame reassembling apparatus 100 updates a Fiber Channel (FC) signal to be the read data, and transitions to [state 3].

For this, the DOCSIS MAC frame reassembling apparatus 100 inspects a state 2 counter value in operation S521, outputs a MAC reassembling buffer read off signal to a MAC reassembling buffer module when the state 2 counter value is different from 3, in operation S522, and maintains a buffer read control state as [state 2], and increases the state 2 counter value by one in operation S523.

However, when the state 2 counter value corresponds to 3, the DOCSIS MAC frame reassembling apparatus 100 compares an R data signal value with 0xFF in operation S524. When the values are same, the DOCSIS MAC frame reassembling apparatus 100 sets the buffer read control state as [state 1] and initializes the state 2 counter value in operation S525. When the R data signal value is different from 0xFF, the DOCSIS MAC frame reassembling apparatus 100 outputs a MAC reassembling buffer read on signal to the MAC reassembling buffer module in operation S526, and transitions the buffer read control state to [state 3], sets an FC signal value as the R data signal value and initializes the state 2 counter value in operation S527.

When operation S527 is completed, the DOCSIS MAC frame reassembling apparatus 100 returns to an initialization mode in operation S528.

Figure 14:
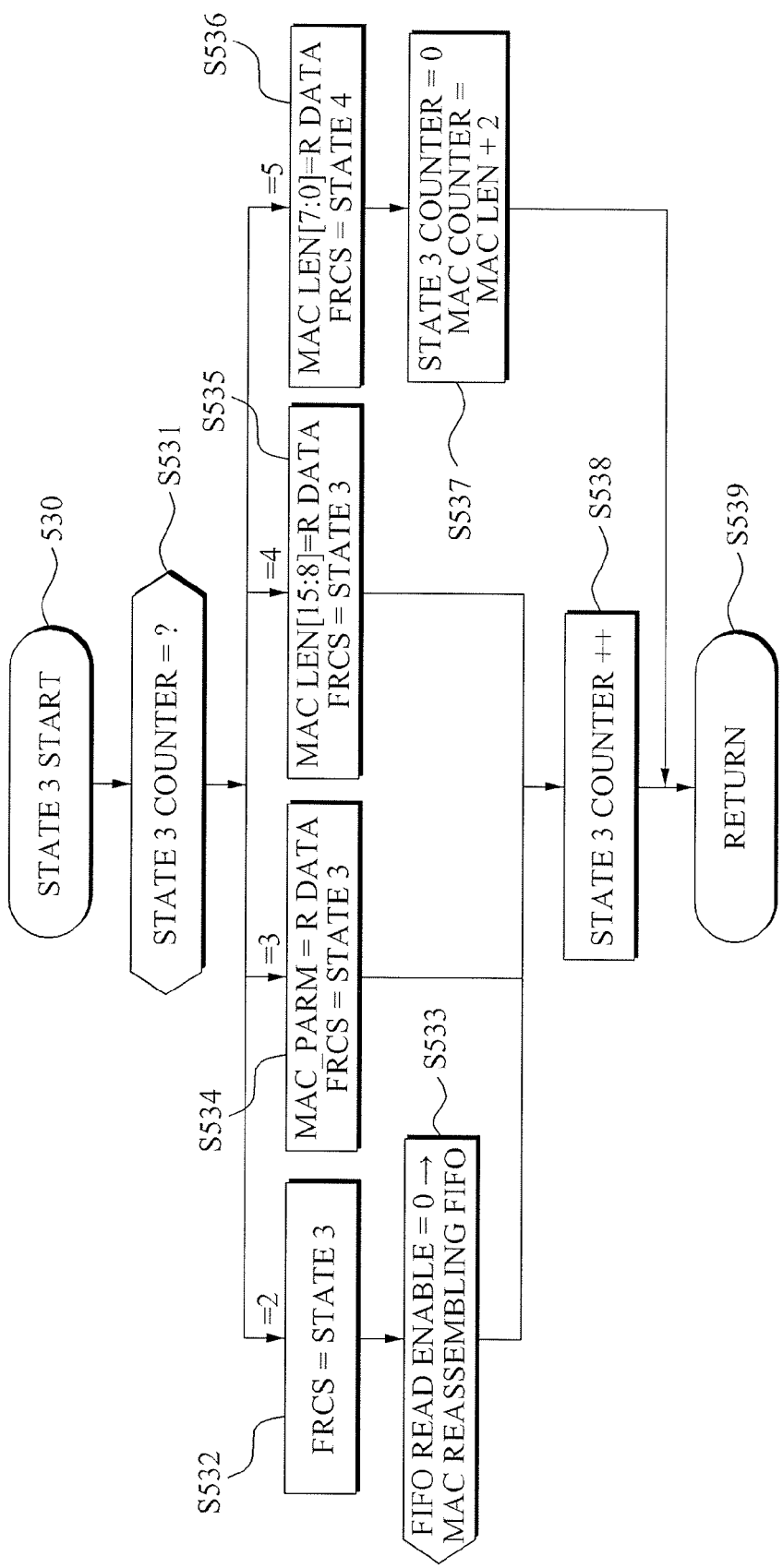
FIG. 14 is a flowchart illustrating operations when the buffer read control state control state of FIG. 11 corresponds to [state 3]

FIG. 14 is a flowchart illustrating operations when the buffer read control state of FIG. 11 corresponds to [state 3] according to an exemplary embodiment of the present invention.

As illustrated in FIG. 14, [state 3] 530 reads overall 3-byte data from a MAC frame reassembling buffer for each 1 byte, updates a MAC parameter (MAC_PARM) signal to be first byte data, and transitions to [state 4] after updating a MAC length (MAC_LEN) signal to be second byte data and third byte data, and simultaneously updating a single DOCSIS MAC frame length value required for processing.

For this, the DOCSIS MAC frame reassembling apparatus 100 inspects a state 3 counter value in operation S531, maintains the buffer read control state as [state 3] when the state 3 counter value is verified as 2, in operation S532, and outputs a MAC reassembling buffer read off signal to a MAC reassembling buffer module in operation S533.

The DOCSIS MAC frame reassembling apparatus 100 sets a MAC parameter (MAC_PARM) signal value as an R data signal value when the state 3 counter value is verified as 3, in operation S534, and sets a MAC length (MAC_LEN) signal 15 to 8 bit value as the R data signal value when the state 3 counter value is verified as 4, in operation S535.

The DOCSIS MAC frame reassembling apparatus 100 sets a MAC length (MAC_LEN) signal 7 to 0 bit value as the R data signal value when the state 3 counter value is verified as 5, in operation S536, initializes the state 3 counter value, and sets a MAC counter value as a value of increasing a MAC length (MAC_LEN) value by two in operation S537.

After completing operations S532, S534, and S535, the DOCSIS MAC flame reassembling apparatus 100 increases the state 3 counter value by one in operation S538, thereby enabling proceeding to a subsequent operation.

When operation S538 is completed, the DOCSIS MAC frame reassembling apparatus 100 returns to an initialization mode in operation S539.

Figure 15:
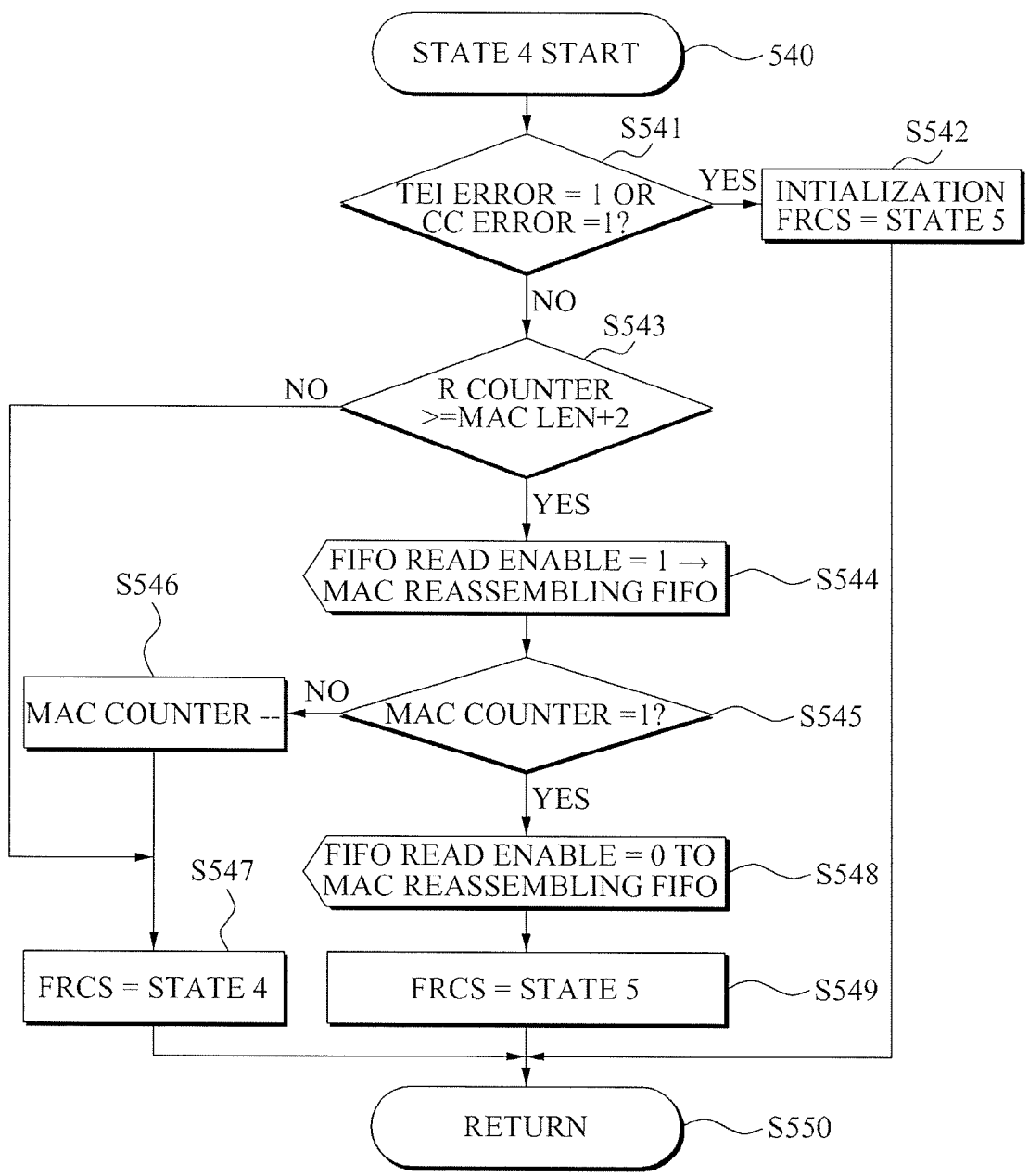
FIG. 15 is a flowchart illustrating operations when the buffer read control state of FIG. 11 corresponds to [state 4]

FIG. 15 is a flowchart illustrating operations when the buffer read control state of FIG. 11 corresponds to [state 4] according to an exemplary embodiment of the present invention.

As illustrated in FIG. 15, [state 4] 540 performs initialization when a TEI and a CC error are reported from a MAC frame reassembling control module, subsequently transitions to [state 5], otherwise verifies that a compete DOCSIS MAC frame is stored in a MAC frame reassembling buffer. This may be known by verifying whether data stored in the MAC frame reassembling buffer is greater than a MAC frame length by two or more. For this, the DOCSIS MAC frame reassembling apparatus 100 inspects an error signal of a TEI field and a CC field in operation S541, and performs the initialization when the error signal corresponds to 1 and the error occurs, and transitions the buffer read control state to [state 5] in operation S542.

When the error signal corresponds to 0 and the error does not occur, the DOCSIS MAC frame reassembling apparatus 100 compares an R counter signal value and a value of increasing a MAC length (MAC_LEN) signal by two in operation S543, and maintains the buffer read control state as [state 4] when the R counter signal value is less than the value, in operation S547.

When the complete DOCSIS MAC frame is not yet stored in the MAC frame reassembling buffer, the DOCSIS MAC frame reassembling apparatus 100 waits until the complete DOCSIS MAC frame is stored. When the complete DOCSIS MAC frame is stored, the DOCSIS MAC frame reassembling apparatus 100 reads a DOCSIS MAC frame from the MAC frame reassembling buffer and stores the DOCSIS MAC frame in a MAC frame buffer module. When the storing is completed, the DOCSIS MAC frame reassembling apparatus 100 transitions to [state 5].

For this, when the R counter signal value is greater than or equal to the value, the DOCSIS MAC frame reassembling apparatus 100 outputs a MAC reassembling buffer read signal 1 to the MAC reassembling buffer module in operation S544, and inspects a MAC counter value in operation S545. When the MAC counter value is different from 1, the DOCSIS MAC frame reassembling apparatus 100 decreases the MAC counter value by one in operation S546, and maintains the buffer read control state as [state 4] in operation S547. When the MAC counter value corresponds to 1, the DOCSIS MAC frame reassembling apparatus 100 outputs a MAC reassembling buffer read signal 0 to the MAC reassembling buffer module in operation S548, and transitions the buffer read control state to [state 5] in operation S549.

When operation S549 is completed, the DOCSIS MAC frame reassembling apparatus 100 returns to an initialization mode in operation S550.

Figure 16:
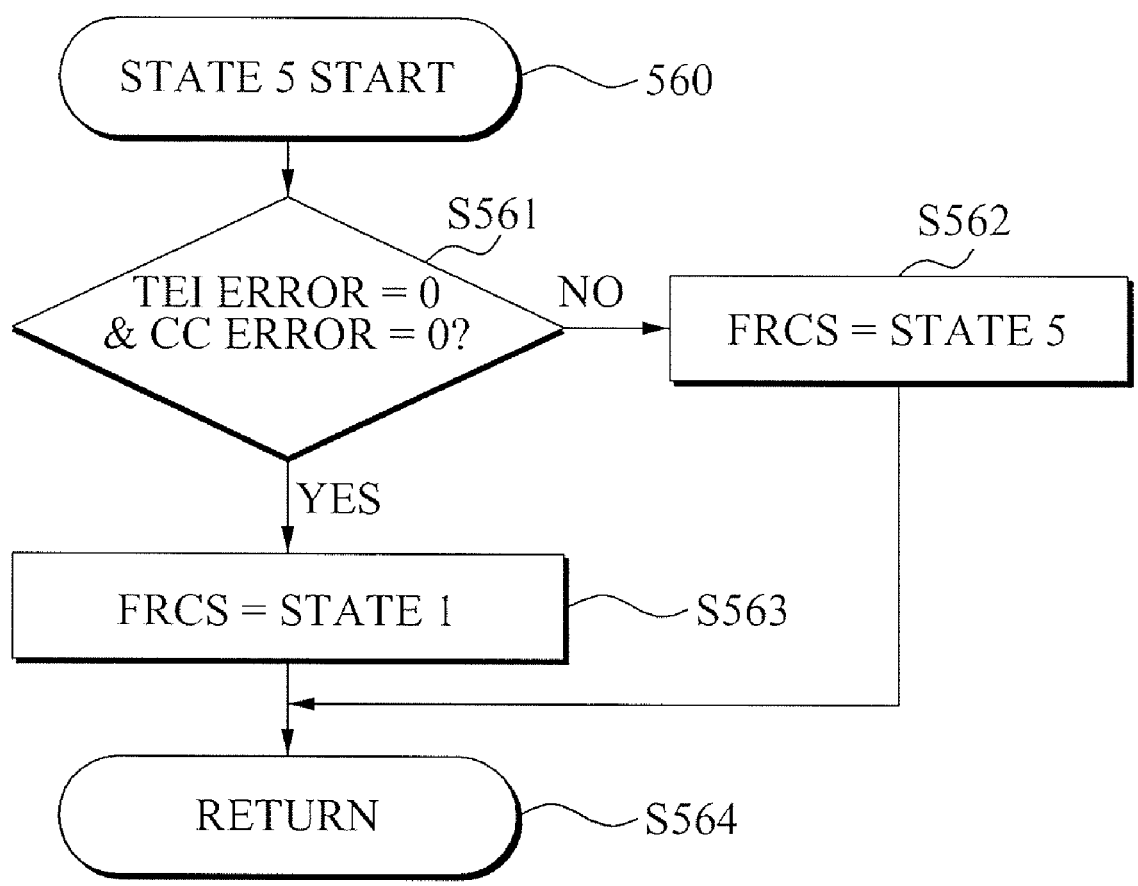
FIG. 16 is a flowchart illustrating operations when the buffer read control state of FIG. 11 corresponds to [state 5]

FIG. 16 is a flowchart illustrating operations when the buffer read control state of FIG. 1 corresponds to [state 5] according to an exemplary embodiment of the present invention.

As illustrated in FIG. 16, [state 5] 560 is a state of inspecting whether a TEI and a CC error occur, returning to an initialization state when the error does not occur, and waiting until the error is completed when the error occurs. The DOCSIS MAC frame reassembling apparatus 100 first inspects an error signal of a TEI field and a CC field in operation S561 maintains the buffer read control state as [state 5] when the signal value corresponds to 1 and the error occurs, in operation S562, and transitions the buffer read control state to [state 1] when the signal value corresponds to 0 and the error does not occur in operation S563.

'On' and 'off' used for a signal value in FIGS. 1 through 16 may be used as various expressions denoting a setting state and a non-setting state of a specific value including '1', '0', and the like.

Examples described below are channel processing examples with respect to TEI processing and CC error processing according to the above-described exemplary embodiment of the present invention.

When operation S563 is completed, the DOCSIS MAC frame reassembling apparatus 100 returns to an initialization mode in operation S564.

FIG. 17 is a diagram illustrating a general form that DOCSIS MAC frames are transported to MPEG-2 TSs in an HFC network according to an exemplary embodiment of the present invention.

As illustrated in FIG. 17, in an MPEG header 611 of a first MPEG2-TS packet 610, a PUSI of 1 bit corresponds to 1 and a CC field of 4 bits correspond to 4. Since the PUSI bit corresponds to 1, a 1-byte point_field 612 exists after an MPEG2-TS header, and this denotes a start of Stuff_bytes 614. Finally, an MPEG payload includes a tail portion of a DOCSIS MAC frame starting from a previous MPEG2-TS packet 613, Stuff_bytes 614, and a start portion of a first DOCSIS MAC frame 615.

In an MPEG header 621 of a second MPEG2-TS packet 620, a PUSI 1 bit corresponds to 0 and a CC field 4 bits correspond to 5. An MPEG payload includes a portion of a DOCSIS MAC frame starting from a first MPEG2-TS packet 622.

In an MPEG header 631 of a third MPEG2-TS packet 630, a PUSI 1 bit corresponds to 1 and a CC field 4 bits correspond to 6. Since the PUSI bit corresponds to 1, a 1-byte point field 632 exists after the MPEG2-TS header, and this denotes a start of a second DOCSIS MAC frame 634. An MPEG payload includes a tail portion of the DOCSIS MAC frame 633 starting from the first MPEG2-TS packet 610, and a start portion of the second DOCSIS MAC frame 634.

In an MPEG header 641 of a fourth MPEG2-TS packet 640, a PUSI 1 bit corresponds to 1 and a CC field 4 bits correspond to 7. Since the PUSI bit corresponds to 1, a 1-byte point field 642 exists after the MPEG2-TS header, and this denotes a start of the third DOCSIS MAC frame 644. An MPEG payload includes a tail portion of the second DOCSIS MAC frame 643 starting from the third MPEG2-TS packet 630, a third DOCSIS MAC frame 644, and a start portion of a fourth DOCSIS MAC frame 645.

As an example of TEI processing, when a TEI is set in the second MPEG2-TS packet 620 in FIG. 17 and a CM sequentially receives and processes four MPEG2-TS packets, the CM receives the first MPEG2-TS packet 610, deletes the tail portion of the previous DOCSIS MAC frame, recognizes a start location of the first DOCSIS MAC frame 615 that newly starts, using a value of Point_field 612, and is aware of a MAC frame length. In particular, the initial Stuff_bytes 614 is deleted.

In order to reassemble a single DOCSIS MAC frame, data of the known MAC frame length needs to be stored in a MAC frame reassembling buffer (FIFO). Accordingly, the CM waits until receiving the subsequent MPEG2-TS packet 620.

When the waiting CM receives the second MPEG2-TS packet 620 in which a TEI bit is set as 1, and recognizes a TEI, the CM needs to delete the received MPEG2-TS packet 620 and simultaneously empty the MAC frame reassembling buffer (FIFO). This is caused by a fact that the data stored in the MAC frame reassembling buffer (FIFO) is unnecessary since a portion of the DOCSIS MAC frame is deleted. When the second MPEG2-TS packet is completely deleted, the CM waits until the third MPEG2-TS packet 630 is received.

The waiting CM receives the third normal MPEG2-TS packet 630, deletes the tail portion of the first DOCSIS MAC frame, recognizes the second DOCSIS MAC frame 634 using the Point_field value, and is aware of the MAC frame length. Since data of the MAC frame length is not stored, the CM stores the third MPEG2-TS packet 630 in the MAC frame reassembling buffer (FIFO), and waits until receiving the fourth MPEG2-TS packet 640.

The waiting CM receives the fourth normal MPEG2-TS packet 640, reassembles and outputs the second DOCSIS MAC frame and the third DOCSIS MAC frame, stores the start portion of the fourth DOCSIS MAC frame in the MAC frame reassembling buffer (FIFO), and waits for a subsequent MPEG2-TS packet.

As an example of CC error processing, when the CM sequentially receives and processes three MPEG2-TS packets excluding the second MPEG2-TS packet 620 in FIG. 17, and recognizes and processes a CC error from a CC field value of the third MPEG2-TS packet 630, the CM receives the first MPEG2-TS packet 610, deletes the tail portion of the previous DOCSIS MAC frame, recognizes the start location of the first DOCSIS MAC frame 615 that newly starts, using the Point_field value, and is aware of the MAC frame length. In particular, the initial Stuff_bytes 614 is deleted.

In order to reassemble the single DOCSIS MAC frame, the data of the known MAC frame length needs to be stored in the MAC frame reassembling buffer (FIFO). Accordingly, the CM waits until the subsequent MPEG2-TS packet 620 is received.

When the waiting CM receives the third normal MPEG2-TS packet 630, compares a CC field value and a previous CC field value, and recognizes a CC field error, the CM deletes the tail portion of the first DOCSIS MAC frame and simultaneously empties the MAC frame reassembling buffer (FIFO). This is caused by a fact that at least one MPEG2-TS packet including the DOCSIS MAC frame is lost and the DOCSIS MAC frame may not be reassembled when the CC value of the inputted packet is greater than the previous CC value by two or more. Since the start of the new DOCSIS MAC frame needs to be recognized when the MAC frame reassembling buffer (FIFO) is emptied, the CM recognizes the second DOCSIS MAC frame 634 using the Point_field value, and is aware of the MAC frame length. Since the data of the known MAC frame length is not stored, the CM stores the third MPEG2-TS packet 630 in the MAC frame reassembling buffer (FIFO), and waits until receiving the fourth MPEG2-TS packet 640.

The waiting CM receives the fourth normal MPEG2-TS packet 640, reassembles and outputs the second DOCSIS MAC frame and the third DOCSIS MAC frame, stores the start portion of the fourth DOCSIS MAC frame in the MAC frame reassembling buffer (FIFO), and waits for the subsequent MPEG2-TS packet.

The DOCSIS MAC frame reassembling apparatus and method in the CM including the plurality of receiving channels according to the above-described exemplary embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, it is possible to process a TEI field error and a CC field error in an MPEG2-TS packet for each 1 byte and detect and process an error from a TEI bit in order to inspect and process the TEI field error and the CC field error of the MPEG2-TS packet of each channel in a CM receiving a plurality of channels. Also, it is possible to detect a CC error based on a DOCSIS MAC frame reassembling state, and process the error based on a PUSI bit value in the MPEG2-TS packet.

Also, according to the present invention, it is possible to include a buffer classified by a channel, control the buffer classified by the channel, and extract a DOCSIS MAC frame from MPEG2-TS packets, thereby minimizing DOCSIS MAC frame loss regardless of a number of receiving channels when an MPEG2-TS packet error occurs, and reassembling the DOCSIS MAC frame.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of controlling reassembling of a Media Access Control (MAC) frame, the method comprising:
receiving a radio frequency signal and outputting a packet signal containing packet data through demodulation and error correction;
receiving the outputted packet signal and controlling a specific compression format standard header and a point field of the packet data;
receiving the packet data and a buffer write enable signal;
storing the data by writing the data in a MAC frame reassembling buffer; and
reading the stored data from the MAC frame reassembling buffer in response to a received buffer read enable signal, and storing the read data in a MAC frame buffer wherein the read data includes a single complete MAC frame.

2. The method of claim 1, wherein the receiving of the outputted packet signal and controlling of the specific compression format standard header and the point field of the packet data comprises:
initializing all used values when a reset signal is verified as being on, and verifying that a clock rises from a low state to a high state when the reset signal is verified as being off;
outputting specific compression format standard data to the MAC frame reassembling buffer each time the reset signal is off and the clock rises from the low state to the high state; and
inspecting a MAC reassembling control state and transitioning between a plurality of additional states based on the control state.

3. The method of claim 2, wherein the inspecting and transitioning comprises:
inspecting a specific compression format standard validity signal, consecutively receiving the data composing a specific compression format standard packet, and eliminating a synchronization byte from among the data when the control state corresponds to a first state; and
checking a transport error indicator bit and a payload unit start indicator bit from among the received data, and determining whether a transport error exists and whether a plurality of MAC frames exists.

4. The method of claim 2, wherein the inspecting and transitioning comprises:
initializing the MAC frame reassembling buffer and simultaneously transitioning to a third state when a transport error indicator field is set and an error of a continuity counter field is verified as occurring, when the control state corresponds to a second state; and
updating a continuity counter value and transitioning to a fourth state when the error is verified as not occurring.

5. The method of claim 2, wherein the inspecting and transitioning comprises:
transitioning to a fifth state after storing a point field value for recognizing a start of a new MAC frame when a transport error occurs in a specific compression format standard packet, or when a single MAC frame exists, when the control state corresponds to a third state.

6. The method of claim 2, wherein the inspecting and transitioning comprises:
transitioning to a fifth state after storing the point field when a payload unit start indicator bit is verified as being on, and inspecting a start frame signal and verifying whether the data is stored in the MAC frame reassembling buffer when the payload unit start indicator bit is verified as being off, when the control state corresponds to a fourth state;
storing the corresponding data in the MAC frame reassembling buffer and transitioning to a sixth state when the data is verified as being stored in the MAC frame reassembling buffer; and
deleting the corresponding data and transitioning to the sixth state when the data is verified as not being stored.

7. The method of claim 2, wherein the inspecting and transitioning comprises:
verifying whether the data corresponds to valid data when a packet receiving counter value and a point field value are compared and the values are different from each other, storing the valid data in the MAC frame reassembling buffer when the data corresponds to the valid data, and deleting invalid data when the data corresponds to the invalid data, when the control state corresponds to a fifth state; and transitioning to a sixth state after updating a start frame signal to be on and setting the buffer write enable signal as on when the values are same based on a comparison result.

8. The method of claim 2, wherein the inspecting and transitioning comprises:

maintaining the MAC reassembling control state as a sixth state when receiving of a specific compression format standard packet is verified as not being completed, when the control state corresponds to the sixth state; and setting the buffer write enable signal as off and returning to a first state when the receiving of the specific compression format standard packet is verified as being completed.

9. The method of claim 1, wherein the receiving of the packet data and the buffer write enable signal and storing the data by writing the data in the MAC frame assembling buffer comprises:

initializing all used values when a reset signal is verified as being on, and verifying that a clock rises from a low state to a high state when the reset signal is verified as being off; and outputting the buffer write enable signal and buffer write data to the MAC frame reassembling buffer when the reset signal is off and the clock rises to the high state.

10. The method of claim 1, wherein the storing of the data by writing the data in the MAC frame reassembling buffer comprises:

receiving a write enable signal and the data from a MAC frame reassembling buffer write module, and receiving a read enable signal from a MAC frame reassembling buffer read module when a reset signal is off and a clock rises from a low state to a high state;

outputting a read counter value to the MAC frame reassembling buffer read module; and outputting the data to the MAC frame reassembling buffer read module when the read enable signal is on, and writing the received data in the MAC frame reassembling buffer when the write enable signal is on, based on inspecting the write enable signal and the read enable signal.

11. The method of claim 1, wherein the reading of the data from the MAC frame reassembling buffer and storing of the read data in the MAC frame buffer comprises:

receiving a read counter value and the data from the MAC frame reassembling buffer;

receiving an error signal of a transport error indicator field and a continuity counter field;

setting an R counter and an R data signal value using the received read counter value and the received data; and inspecting a buffer read control state and transitioning between states based on the control state.

12. The method of claim 11, wherein the inspecting and transitioning comprises:

when the control state corresponds to a first state, transitioning the buffer read control state to a fifth state when a transport error or an error of a continuity counter exists based on a verification result of the error signal of the transport error indicator field and the continuity counter field; and transitioning the buffer read control state to a second state based on the R counter value when the transport error or the error of the continuity counter does not exist based on the verification result.

13. The method of claim 11, wherein the inspecting and transitioning comprises:

outputting a MAC reassembling buffer read off signal to the MAC frame reassembling buffer, and increasing a second state counter value by one when the second state counter value is verified as being different from 3, when the control state corresponds to a second state; and comparing the R data signal value with 0xFF when the second state counter value is verified as 3, outputting a buffer read on signal to the MAC frame reassembling buffer, and transitioning the buffer read control state to a third state when the R data signal value is different from 0xFF.

14. The method of claim 11, wherein the inspecting and transitioning comprises:

reading the data from the MAC frame reassembling buffer when the control state corresponds to a third state; and updating a MAC parameter signal to be first byte data from among the data; and transitioning to a fourth state after updating a MAC length signal to be second byte data and third byte data and updating a MAC frame length value.

15. The method of claim 11, wherein the inspecting and transitioning comprises:

transitioning to a fifth state after initializing the transport error indicator field and the continuity counter field when the error signal of the transport error indicator field and the continuity counter field is on, when the control state corresponds to a fourth state; and storing a MAC frame of the MAC frame reassembling buffer in the MAC frame buffer, and transitioning to the fifth state when a complete MAC frame is verified as being stored in the MAC frame reassembling buffer, when the error signal is off.

16. The method of claim 11, wherein the inspecting and transitioning comprises:

verifying whether the transport error indicator field is set and an error of the continuity counter field occurs, returning to a first state when the transport error indicator field is not set and the error does not occur, and waiting until the error ends when the error occurs, when the control state corresponds to a fifth state.

* * * * *